US008388452B2

(12) United States Patent
Auterio et al.

(10) Patent No.: US 8,388,452 B2
(45) Date of Patent: Mar. 5, 2013

(54) GAME-BASED INCENTIVES FOR LOCATION-BASED ACTIONS

(75) Inventors: Kathleen Auterio, San Francisco, CA (US); Deniz Ersever, San Francisco, CA (US); Hardik Kheskani, Gujarat (IN); Serena Lam, San Francisco, CA (US); Christopher Joseph Makarsky, San Francisco, CA (US); Donald C. Mosites, San Francisco, CA (US); Benjamin Mullin, San Francisco, CA (US); Shantanu Talapatra, San Francisco, CA (US); Justin Waldron, San Francisco, CA (US); Jackson Wang, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,939

(22) Filed: Sep. 26, 2011

(65) Prior Publication Data

US 2012/0040747 A1     Feb. 16, 2012

Related U.S. Application Data

(63) Continuation of application No. 13/174,715, filed on Jun. 30, 2011, which is a continuation of application No. 12/856,508, filed on Aug. 13, 2010.

(51) Int. Cl.
*A63F 9/24*     (2006.01)
(52) U.S. Cl. ...................... 463/42; 705/14.12
(58) Field of Classification Search .............. 463/42; 705/14.12
See application file for complete search history.

(56) References Cited

U.S. PATENT DOCUMENTS

| | | | |
|---|---|---|---|
| 6,040,783 A * | 3/2000 | Houvener et al. ........... 340/5.53 |
| 6,299,534 B1 | 10/2001 | Breeding et al. |
| 6,325,292 B1 | 12/2001 | Sehr |
| 6,569,011 B1 | 5/2003 | Lynch et al. |
| 7,343,317 B2 | 3/2008 | Jokinen et al. |
| 7,493,267 B1 | 2/2009 | Walker et al. |
| 7,716,053 B2 | 5/2010 | Shimoda et al. |
| 7,783,183 B2 | 8/2010 | Garg et al. |
| 7,856,360 B2 | 12/2010 | Kramer et al. |
| 7,895,076 B2 | 2/2011 | Kutaragi et al. |
| 7,955,175 B1 | 6/2011 | Holloway et al. |
| 8,029,359 B2 | 10/2011 | Cheng |
| 8,226,472 B2 | 7/2012 | Van Luchene |
| 8,282,491 B2 | 10/2012 | Auterio et al. |
| 8,287,383 B1 | 10/2012 | Etter et al. |
| 8,287,384 B2 | 10/2012 | Auterio et al. |
| 8,292,743 B1 | 10/2012 | Etter et al. |
| 2001/0049304 A1 | 12/2001 | Orui |
| 2002/0006825 A1 | 1/2002 | Suzuki |
| 2002/0026321 A1 | 2/2002 | Faris et al. |

(Continued)

FOREIGN PATENT DOCUMENTS

WO    WO-2012021305 A1    2/2012

OTHER PUBLICATIONS

"About Foursquare", Search Results [retrieved on Jan. 17, 2012]. Retrieved from <http://wayback.archive.org/web/20100615000000*/http://aboutfoursquare.com/foursquare-101>, (Dec. 12, 2010), 1 pg.

(Continued)

*Primary Examiner* — Corbett B Coburn
(74) *Attorney, Agent, or Firm* — Schwegman, Lundberg & Woessner, P.A.

(57) ABSTRACT

Systems and methods for providing game-based incentives to users of online games as a reward for performing actions at physical locations are provided.

21 Claims, 10 Drawing Sheets

U.S. PATENT DOCUMENTS

| | | | |
|---|---|---|---|
| 2002/0090985 | A1 | 7/2002 | Tochner et al. |
| 2002/0111201 | A1 | 8/2002 | Lang |
| 2003/0032476 | A1 | 2/2003 | Walker et al. |
| 2003/0060247 | A1 | 3/2003 | Goldberg et al. |
| 2005/0049022 | A1 | 3/2005 | Mullen |
| 2005/0055115 | A1 | 3/2005 | Gerrard et al. |
| 2005/0137015 | A1 | 6/2005 | Rogers et al. |
| 2005/0177428 | A1 | 8/2005 | Ganz |
| 2006/0073809 | A1 | 4/2006 | Juetten et al. |
| 2006/0105838 | A1 | 5/2006 | Mullen |
| 2006/0128469 | A1 | 6/2006 | Willis et al. |
| 2006/0235747 | A1 | 10/2006 | Hammond et al. |
| 2007/0018952 | A1 | 1/2007 | Arseneau |
| 2007/0021166 | A1 | 1/2007 | Mattila |
| 2007/0149286 | A1 | 6/2007 | Bemmel |
| 2007/0190494 | A1 | 8/2007 | Rosenberg |
| 2008/0059304 | A1 | 3/2008 | Kimsey |
| 2008/0086261 | A1 | 4/2008 | Robinson et al. |
| 2008/0096665 | A1 | 4/2008 | Cohen |
| 2008/0146338 | A1 | 6/2008 | Bernard et al. |
| 2008/0163055 | A1* | 7/2008 | Ganz et al. ............... 715/706 |
| 2008/0167129 | A1 | 7/2008 | Aaron et al. |
| 2009/0005140 | A1 | 1/2009 | Rose et al. |
| 2009/0017913 | A1 | 1/2009 | Bell et al. |
| 2009/0248544 | A1 | 10/2009 | Ganz |
| 2010/0009758 | A1 | 1/2010 | Twitchell, Jr. |
| 2010/0016080 | A1 | 1/2010 | Garden et al. |
| 2010/0062840 | A1 | 3/2010 | Herrmann |
| 2010/0151940 | A1 | 6/2010 | Borge |
| 2010/0160038 | A1 | 6/2010 | Youm et al. |
| 2010/0203933 | A1 | 8/2010 | Eyzaguirre et al. |
| 2010/0203963 | A1 | 8/2010 | Allen et al. |
| 2010/0216553 | A1 | 8/2010 | Chudley et al. |
| 2010/0223115 | A1 | 9/2010 | Chodosh et al. |
| 2010/0227675 | A1 | 9/2010 | Luxton et al. |
| 2010/0279764 | A1 | 11/2010 | Allen et al. |
| 2010/0287011 | A1 | 11/2010 | Muchkaev |
| 2010/0304804 | A1 | 12/2010 | Spivack |
| 2010/0317392 | A1 | 12/2010 | Davis et al. |
| 2010/0317419 | A1 | 12/2010 | Osborne |
| 2010/0331089 | A1 | 12/2010 | Priebatsch et al. |
| 2010/0332301 | A1 | 12/2010 | Higgins et al. |
| 2011/0039622 | A1 | 2/2011 | Levenson |
| 2011/0039623 | A1 | 2/2011 | Levenson |
| 2011/0053692 | A1 | 3/2011 | Farr-Jones et al. |
| 2011/0093349 | A1 | 4/2011 | Drescher et al. |
| 2011/0112892 | A1 | 5/2011 | Tarantino |
| 2011/0124399 | A1* | 5/2011 | Dutilly et al. ............... 463/25 |
| 2011/0145137 | A1 | 6/2011 | Driemeyer et al. |
| 2011/0148061 | A1 | 6/2011 | Johnson et al. |
| 2011/0207531 | A1* | 8/2011 | Gagner et al. ............... 463/30 |
| 2011/0212762 | A1 | 9/2011 | Ocko et al. |
| 2011/0212783 | A1 | 9/2011 | Dale et al. |
| 2011/0223895 | A1 | 9/2011 | Wagda et al. |
| 2011/0312423 | A1* | 12/2011 | Mosites et al. ............... 463/42 |
| 2012/0015730 | A1 | 1/2012 | Watkins, Jr. et al. |
| 2012/0040743 | A1 | 2/2012 | Auterio et al. |
| 2012/0040745 | A1 | 2/2012 | Auterio et al. |
| 2012/0040746 | A1 | 2/2012 | Auterio et al. |
| 2012/0040760 | A1 | 2/2012 | Auterio et al. |
| 2012/0040761 | A1 | 2/2012 | Auterio et al. |
| 2012/0040763 | A1 | 2/2012 | Auterio et al. |
| 2012/0066040 | A1 | 3/2012 | Farraro et al. |
| 2012/0124176 | A1 | 5/2012 | Curtis et al. |
| 2012/0203619 | A1 | 8/2012 | Lutnick et al. |
| 2012/0215667 | A1 | 8/2012 | Ganz et al. |
| 2012/0232971 | A1 | 9/2012 | Pabst et al. |
| 2012/0233158 | A1 | 9/2012 | Braginsky et al. |

OTHER PUBLICATIONS

"U.S. Appl. No. 12/856,508, Non Final Office Action mailed Apr. 10, 2012", 7 pgs.

"U.S. Appl. No. 12/856,508, filed Jul. 10, 2012 to Non Final Office Action mailed Apr. 10, 2012", 11 pgs.

"U.S. Appl. No. 12/856,508, filed Aug. 24, 2012 to Restriction Requirement mailed Jul. 24, 2012-12", 13 pgs.

"U.S. Appl. No. 12/856,508, Restriction Requirement mailed Mar. 7, 2012", 7 pgs.

"U.S. Appl. No. 12/856,508, Restriction Requirement mailed Jul. 24, 2012", 6 pgs.

"U.S. Appl. No. 12/856,508, filed Mar. 30, 2012 to Restriction Requirement mailed Mar. 7, 2012", 14 pgs.

"U.S. Appl. No. 13/174,715, filed Aug. 8, 2012 to Non Final Office Action mailed May 8, 2012", 10 pgs.

"U.S. Appl. No. 13/174,715, Non Final Office Action mailed May 8, 2012", 8 pgs.

"U.S. Appl. No. 13/174,720, Non Final Office Action mailed Jan. 20, 2012", 13 pgs.

"U.S. Appl. No. 13/174,720, filed Apr. 20, 2012 to Non Final Office Action mailed Jan. 20, 2012", 11 pgs.

"U.S. Appl. No. 13/174,724, Examiner Interview Summary mailed Feb. 8, 2012", 3 pgs.

"U.S. Appl. No. 13/174,724, Non Final Office Action mailed Jan. 9, 2012", 6 pgs.

"U.S. Appl. No. 13/174,724, Notice of Allowance mailed May 1, 2012", 9 pgs.

"U.S. Appl. No. 13/174,724, filed Apr. 9, 2012 to Non Final Office Action mailed Jan. 9, 2012", 8 pgs.

"U.S. Appl. No. 13/174,729, Final Office Action mailed Jun. 7, 2012", 11 pgs.

"U.S. Appl. No. 13/174,729, Non Final Office Action mailed Jan. 4, 2012", 10 pgs.

"U.S. Appl. No. 13/174,729, filed Apr. 4, 2012 to Non Final Office Action mailed Jan. 4, 2012", 10 pgs.

"U.S. Appl. No. 13/174,735, Non Final Office Action mailed Apr. 6, 2012", 12 pgs.

"U.S. Appl. No. 13/174,735, filed Aug. 6, 2012 to Non Final Office Action mailed Apr. 6, 2012", 11 pgs.

"U.S. Appl. No. 13/174,737, Non Final Office Action mailed Feb. 29, 2012", 8 pgs.

"U.S. Appl. No. 13/174,737, filed Jun. 29, 2012 to Non Final Office Action mailed Feb. 29, 2012", 9 pgs.

"U.S. Appl. No. 13/174,741, Examiner Interview Summary mailed Feb. 8, 2012", 3 pgs.

"U.S. Appl. No. 13/174,741, Examiner Interview Summary mailed Jul. 31, 2012", 4 pgs.

"U.S. Appl. No. 13/174,741, Final Office Action mailed Jun. 12, 2012", 18 pgs.

"U.S. Appl. No. 13/174,741, Non Final Office Action mailed Dec. 23, 2011", 16 pgs.

"U.S. Appl. No. 13/174,741, filed Mar. 23, 2012 to Non Final Office Action mailed Dec. 23, 2011", 15 pgs.

"U.S. Appl. No. 13/174,747, Non Final Office Action mailed Jan. 30, 2012", 7 pgs.

"U.S. Appl. No. 13/174,747, Notice Non-Compliant Amendment mailed Jun. 19, 2012", 9 pgs.

"U.S. Appl. No. 13/174,747, filed May 30, 2012 to Non Final Office Action mailed Jan. 30, 2012", 10 pgs.

"U.S. Appl. No. 13/244,681, Non Final Office Action mailed Mar. 14, 2012", 17 pgs.

"U.S. Appl. No. 13/244,681, filed Jun. 14, 2012 to Non Final Office Action mailed Mar. 14, 2012", 13 pgs.

"U.S. Appl. No. 13/244,726, Non Final Office Action mailed Jan. 31, 2012", 16 pgs.

"U.S. Appl. No. 13/244,726, filed Apr. 30, 2012 to Non Final Office Action mailed Jan. 31, 2012", 11 pgs.

"U.S. Appl. No. 13/244,763, filed May 17, 2012 to Non Final Office Action mailed Feb. 17, 2012", 9 pgs.

"U.S. Appl. No. 13/244,763, Final Office Action mailed Jun. 21, 2012", 8 pgs.

"U.S. Appl. No. 13/244,763, Non Final Office Action mailed Feb. 17, 2012", 8 pgs.

"U.S. Appl. No. 13/244,773, Non Final Office Action Mailed Jan. 31, 2012", 16 pgs.

"U.S. Appl. No. 13/244,773, filed Apr. 30, 2012 to Non Final Office Action mailed Jan. 31, 2012", 13 pgs.

"U.S. Appl. No. 13/244,780, Non Final Office Action mailed Jan. 25, 2012", 15 pgs.

"U.S. Appl. No. 13/244,780, filed Apr. 25, 2012 to Non Final Office Action mailed Jan. 25, 2012", 13 pgs.
"U.S. Appl. No. 13/244,801, Examiner Interview Summary mailed Feb. 10, 2012", 3 pgs.
"U.S. Appl. No. 13/244,801, Examiner Interview Summary mailed Apr. 16, 2012", 1 pg.
"U.S. Appl. No. 13/244,801, Non Final Office Action mailed Jan. 9, 2012", 6 pgs.
"U.S. Appl. No. 13/244,801, Notice of Allowance mailed May 1, 2012", 9 pgs.
"U.S. Appl. No. 13/244,801, filed Apr. 9, 2012 to Non Final Office Action mailed Jan. 9, 2012", 9 pgs.
"U.S. Appl. No. 13/244,809, Final Office Action mailed Jun. 18, 2012", 11 pgs.
"U.S. Appl. No. 13/244,809, Non Final Office Action mailed Jan. 3, 2012", 9 pgs.
"U.S. Appl. No. 13/244,809, filed Apr. 3, 2012 to Non Final Office Action mailed Jan. 3, 2012", 9 pgs.
"U.S. Appl. No. 13/244,814 , filed Jul. 9, 2012 to Non Final Office Action mailed Apr. 9, 2012", 10 pgs.
"U.S. Appl. No. 13/244,814, Non Final Office Action mailed Apr. 9, 2012", 9 pgs.
"U.S. Appl. No. 13/244,826, Non Final Office Action mailed Feb. 29, 2012", 7 pgs.
"U.S. Appl. No. 13/244,826, filed May 29, 2012 to Non Final Office Action mailed Feb. 29, 2012", 10 pgs.
"U.S. Appl. No. 13/244,924, Final Office Action mailed Jun. 6, 2012", 17 pgs.
"U.S. Appl. No. 13/244,924, Non Final Office Action mailed Feb. 29, 2012", 8 pgs.
"U.S. Appl. No. 13/244,924, Notice of Allowance mailed Aug. 17, 2012", 8 pgs.
"U.S. Appl. No. 13/244,924, filed Feb. 13, 2012 to Restriction Requirement mailed Jan. 13, 2012", 9 pgs.
"U.S. Appl. No. 13/244,924, filed May 29, 2012 to Non Final Office Action mailed Feb. 29, 2012", 12 pgs.
"U.S. Appl. No. 13/244,924, filed Aug. 6, 2012 to Final Office Action mailed Jun. 6, 2012", 9 pgs.
"U.S. Appl. No. 13/244,924, Restriction Requirement mailed Jan. 13, 2012", 6 pgs.
"U.S. Appl. No. 13/244,926, Examiner Interview Summary mailed Feb. 8, 2012", 3 pgs.
"U.S. Appl. No. 13/244,926, Examiner Interview Summary mailed Aug. 1, 2012", 3 pgs.
"U.S. Appl. No. 13/244,926, Final Office Action mailed May 30, 2012", 15 pgs.
"U.S. Appl. No. 13/244,926, Non Final Office Action Mailed Dec. 21, 2011", 16 pgs.
"U.S. Appl. No. 13/244,926, filed Mar. 21, 2012 to Non Final Office Action mailed Dec. 21, 2011", 14 pgs.
"U.S. Appl. No. 13/244,932, Non Final Office Action mailed Apr. 11, 2012", 9 pgs.
"U.S. Appl. No. 13/244,932, Notice of Allowance mailed Aug. 16, 2012", 9 pgs.
"U.S. Appl. No. 13/244,932, filed Mar. 30, 2012 to Restriction Requirement mailed Mar. 1, 2012", 7 pgs.
"U.S. Appl. No. 13/244,932, filed Jul. 10, 2012 to Non Final Office Action mailed Apr. 11, 2012", 10 pgs.
"U.S. Appl. No. 13/244,932, Restriction Requirement mailed Mar. 1, 2012", 6 pgs.
"U.S. Appl. No. 13/244,934, Final Office Action mailed May 16, 2012", 7 pgs.
"U.S. Appl. No. 13/244,934, Non Final Office Action Mailed Feb. 7, 2012", 7 pgs.
"U.S. Appl. No. 13/244,934, filed Jan. 30, 2012 to Restriction Requirement mailed Dec. 29, 2011", 14 pgs.
"U.S. Appl. No. 13/244,934, filed May 7, 2012 to Non Final Office Action mailed Feb. 7, 2012", 7 pgs.
"U.S. Appl. No. 13/244,934, filed Aug. 16, 2012 to Final Office Action mailed May 16, 2012", 10 pgs.
"U.S. Appl. No. 13/244,934, Restriction Requirement mailed Dec. 29, 2011", 6 pgs.
"U.S. Appl. No. 13/244,937, Final Office Action mailed Jun. 29, 2012", 9 pgs.
"U.S. Appl. No. 13/244,937, Non Final Office Action mailed Mar. 21, 2012", 9 pgs.
"U.S. Appl. No. 13/244,937, filed Mar. 7, 2012 to Restriction Requirement mailed Feb. 6, 2012", 8 pgs.
"U.S. Appl. No. 13/244,937, filed Jun. 21, 2012 to Non Final Office Action mailed Mar. 21, 2012", 12 pgs.
"U.S. Appl. No. 13/244,937, Restriction Requirement mailed Feb. 6, 2012", 6 pgs.
"Axis and Allies", 'Axis and Allies: Pacific' Gameplay Manual, retrieved from <http://www.wizards.com/>, Hasbro, Pawtucket, RI, (2000), 36 pgs.
"Earning badges", [Online]. Retrieved from the Internet: <URL: http://support.foursquare.com/entries/214581-i-think-o-should-have-earned-a-badge-but-it-s-not-showing-up-on-my-account-what-gives>, (Accessed Jun. 6, 2012), 2 pgs.
"Foursquare Badges", [Online]. Retrieved from the Internet: <URL: 20101112164048/http://thekruser.com/foursquare/badges/, (Accessed Jun. 6, 2012), 47 pgs.
"How Do I Check in on Foursquare?", [Online}. Retrieved from the Internet: <URL: http://support.foursquare.com/entries/188252-how-do-I-check-in-on-foursquare>, (Accessed Jan. 17, 2012), 2 pgs.
"How Do I Earn Badges?", [Online]. Retrieved from the Internet: <URL: http://support.foursquare.com/entries/215406-how-do-I-earn badges>, (2010), 1 pg.
"International Application Serial No. PCT/US2011/045782, International Search Report mailed Dec. 23, 2011", 2 pgs.
"International Application Serial No. PCT/US2011/045782, Written Opinion mailed Dec. 23, 2011", 5 pgs.
"Itunes Preview: Turf Wars", [Online] Retrieved from Internet:<http://web.archive.org/web/20100328171725/http://itunes.apple.com/app/turf-wars/id332185049?mt=8>, (Accessed Dec. 16, 2011), 4 pgs.
"Monster Hunter Freedom", Game Manual Capcom. 2006, [Online]. Retrieved from the Internet: <http://www.replacementdocs.com/download/php?view.6299>, (Accessed Mar. 28, 2012), 14 pgs.
"Monster Hunter Freedom", Product Page. Amazon.com. 2006, [Online]. Retrieved from the Internet: <http://www.amazon.com/Monster-Hunter-Freedom-Sony-PSP/dp/B000CBCVEU>, (Retrieved Mar. 28, 2012), 9 pgs.
"New Bigger Swarm Badges", [Onine]. Retrieved from the Internet: <URL: http://blog.foursquare .com/2010/ 10/29/new-bigger-swarm-badges/>, (Accessed Jan. 17, 2012), 9 pgs.
"Official Risk Board Game Rules", [Online Retrieved from <http://www.hasbro.com/common/instruct/risk.pdf>, (Accessed Dec. 31, 1993), 16 pgs.
"Scvngr gamers can check in by bumping phones together", [Online]. Retrieved from the Internet: <http://venturebeat.com/2010/07/20/scvngr-checkin-bump/>, (Accessed Feb. 13, 2012), 5 pgs.
"turfwarsapp", turfwarsapp.com, [Online]. Retrieved from the Internet: <URL: http://turfwarsapp.com/>, (Accessed Dec. 15, 2011), 57 pgs.
"Unofficial Turf Wars FAQ", [Online]. Retrieved from the Internet: <http://www.turfwarsfaq.com/ >, (Accessed Dec. 15, 2011), 38 pgs.
Cutler, Kim-Mai, "CrowdMob's Mafia Location Game Harnesses Facebook Places to Drive Downloads", [Online] Retrieved from Internet: <http://www.insidemobileapps.com/2011/06/08/crowdmob/>, (Accessed Dec. 14, 2011), 3 pgs.
Haynes, Jeff, "Mushroom Wars Review", [Online]. Retrieved from Internet: <http://web.archive.org/web/20091024082655/http://ps3.ign.com/articles/103/1038151p1.html>, (Accessed Dec. 14, 2011), 3 pgs.
Jones, Michael, "Own This World: iPhone App Review", [Online]. Retrieved from Internet: <http://chealion.ca/2010/03/own-this-world-iphone-app-review/>, (Accessed Dec. 15, 2011), 6 pgs.
Siegler, MG, "My Town 2.0 Evolves The Gaming and Monetization of Location", [Online] Retrieved from Internet: <http://techcrunch.com/2010/01/20/mytown-2-location/>, (Accessed Jan. 20, 2010), 12 pgs.
Thompson, Chris, "How to create your first foursquare special", Copyright © 2012 About Foursquare., [Online]. Retrieved from the Internet: <URL: http://aboutfoursquare.com/how-to-create-your-first-foursquare-special/>, (Mar. 16, 2011), 5 pgs.

Thompson, Chris, "What is a shout?", Copyright © 2012 About Foursquare, [Online]. Retrieved from the Internet: <URL: http://aboutfoursquare.com/what-is-a-shout/>, (May 10, 2010), 1 pg.

Van Grove, Jennifer, "FourSquare + Google Maps = FourWhere", retrieved from URL<http://mashable.com/2010/03/09/fourwhere/>, (Mar. 9, 2010), 2 pgs.

Van Grove, Jennifer, "FourSquare and Starbucks Team Up to Offer Customer Rewards", retrieved from URL<ttp://web.archive.org/web/20100314033814/http://mashable.com/2010/03/11/toursquare-starbucks/>, (Mar. 14, 2010), 1 pg.

Zamora, Al, "Turf Wars Review", [Online]. Retrieved from Internet<http://web.archive.org/web/20100304043316/http://dualshockers.com/2010/01/21/turf-wars-review/>, (Accessed Dec. 14, 2011), 6 pgs.

Zhephree, "Foursquare and Your Phone's GPS", [Online]. Retrieved from the Internet: <http://blog.zhephree.com/post/595855963/foursquare-and-your-phones-gps>, (Accessed Feb. 13, 2012), 4 pgs.

"U.S. Appl. No. 12/856,508, Examiner Interview Summary mailed Oct. 11, 2012", 2 pgs.

"U.S. Appl. No. 12/856,508, Notice of Allowance mailed Oct. 15, 2012", 8 pgs.

"U.S. Appl. No. 13/174,715, Non Final Office Action mailed Dec. 13, 2012", 6 pgs.

"U.S. Appl. No. 13/174,715, filed Nov. 27, 2012 to Final Office Action mailed Aug. 27, 2012", 10 pgs.

"U.S. Appl. No. 13/174,717, Non Final Office Action mailed Oct. 9, 2012", 12 pgs.

"U.S. Appl. No. 13/174,729, filed Sep. 21, 2012 to Final Office Action mailed Jun. 7, 2012", 11 pgs.

"U.S. Appl. No. 13/174,735, Final Office Action mailed Nov. 20, 2012", 12 pgs.

"U.S. Appl. No. 13/174,741, Notice of Allowance mailed Dec. 10, 2012", 20 pgs.

"U.S. Appl. No. 13/174,741, filed Oct. 12, 2012 to Final Office Action mailed Jun. 12, 2012", 17 pgs.

"U.S. Appl. No. 13/174,747, filed Oct. 19, 2012 to Non Final Office Action mailed Jan. 30, 2012", 9 pgs.

"U.S. Appl. No. 13/174,747, filed Oct. 19, 2012 to Non-Final Office Action mailed Jan. 30, 2012", 9 pgs.

"U.S. Appl. No. 13/244,681, Final Office Action mailed Oct. 2, 2012", 16 pgs.

"U.S. Appl. No. 13/244,726, Notice of Non-Compliant Amendment mailed Aug. 16, 2012", 9 pgs.

"U.S. Appl. No. 13/244,726, filed Sep. 17, 2012 to Non Final Office Action mailed Jan. 31, 2012", 11 pgs.

"U.S. Appl. No. 13/244,763, filed Sep. 19, 2012 Final Office Action mailed Jun. 21, 2012", 9 pgs.

"U.S. Appl. No. 13/244,773, Notice of Non-Compliant Amendment mailed Aug. 14, 2012", 9 pgs.

"U.S. Appl. No. 13/244,773, filed Sep. 14, 2012 to Non Final Office Action mailed Jan. 13, 2012", 12 pgs.

"U.S. Appl. No. 13/244,780, Final Office Action mailed Sep. 13, 2012", 10 pgs.

"U.S. Appl. No. 13/244,814, Final Office Action mailed Nov. 2, 2012", 12 pgs.

"U.S. Appl. No. 13/244,826, Final Office Action mailed Nov. 26, 2012", 10 pgs.

"U.S. Appl. No. 13/244,926, filed Oct. 1, 2012 to Final Office Action mailed May 30, 2012", 11 pgs.

"U.S. Appl. No. 13/244,926, Notice of Allowance mailed Nov. 29, 2012", 11 pgs.

"U.S. Appl. No. 13/244,934, filed Nov. 30, 2012 to Non Final Office Action mailed Aug. 31, 2012", 9 pgs.

"U.S. Appl. No. 13/244,937, Notice of Allowance mailed Oct. 2, 2012", 7 pgs.

"U.S. Appl. No. 13/174,715, Final Office Action mailed Aug. 27, 2012", 7 pgs.

"U.S. Appl. No. 13/174,724, Notice of Allowability mailed Aug. 30, 2012", 2 pgs.

"U.S. Appl. No. 13/244,801, Notice of Allowability mailed Sep. 5, 2012", 2 pgs.

"U.S. Appl. No. 13/244,809, filed Sep. 17, 2012 to Final Office Action mailed Jun. 18, 2012", 11 pgs.

"U.S. Appl. No. 13/244,934, Non Final Office Action mailed Aug. 31, 2012", 7 pgs.

"U.S. Appl. No. 13/244,937, filed Aug. 30, 2012 to Final Office Action mailed Jun. 29, 2012", 8 pgs.

* cited by examiner

(12) United States Patent
US 8,388,452 B2

GAME-BASED INCENTIVES FOR LOCATION-BASED ACTIONS

CLAIM OF PRIORITY

This application is a continuation of and claims the benefit of priority under 35 U.S.C. §120 to U.S. patent application Ser. No. 13/174,715, filed on Jun. 30, 2011, which is a continuation of and claims the benefit of priority under 35 U.S.C. §120 to U.S. patent application Ser. No. 12/856,508, filed on Aug. 13, 2010, which is hereby incorporated by reference herein in its entirety.

TECHNICAL FIELD

The present disclosure generally relates to games and applications in general and in particular to computer-implemented online games, such as online role-playing games (RPGs), playable by more than one person from more than one location.

BACKGROUND

In many games, there is a virtual world or some other imagined playing space where a player of the game controls one or more player characters (herein "characters," "player characters," or "PCs"). Player characters can be considered in-game representations of the controlling player. As used here, the terms player, user, entity, and friend may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, or other in-game items of value. In some games, the goal of the game may be to acquire in-game rewards. For example, a player may strive to achieve a high score by accumulating points that are granted for performing in-game tasks or overcoming in-game obstacles.

Many online computer games are operated on an online social network. Such a network allows both users and other parties to interact with the computer games directly, whether to play the games or to retrieve game- or user-related information.

Many operators of physical (i.e., "real-world") locations allow users to conduct a variety of actions on their property, such as visiting the location, performing certain tasks or actions at the location, purchasing goods and services at the location, etc. Goods can include items that are physical and tangible, items that are delivered electronically to the user over the Internet, and items that are delivered through conventional distribution channels (e.g., a common carrier).

As used herein, a user is a player of an online computer game. Additionally, as used herein, an item can include a good or service offered by a location operator. Similarly, as used herein, a purchase (or order) can include buying, renting, or licensing an item from a location operator.

Internet users may maintain one or more accounts with various service providers, including online gaming systems, online social networking systems, online merchant systems, physical location systems, etc. Online systems can typically be accessed using browser clients (e.g., Firefox, Chrome, Internet Explorer). Locations may also include network addressable systems that can communicate over a wide area network environment, such as the Internet.

DESCRIPTION OF EXAMPLE EMBODIMENTS

Figure 1:
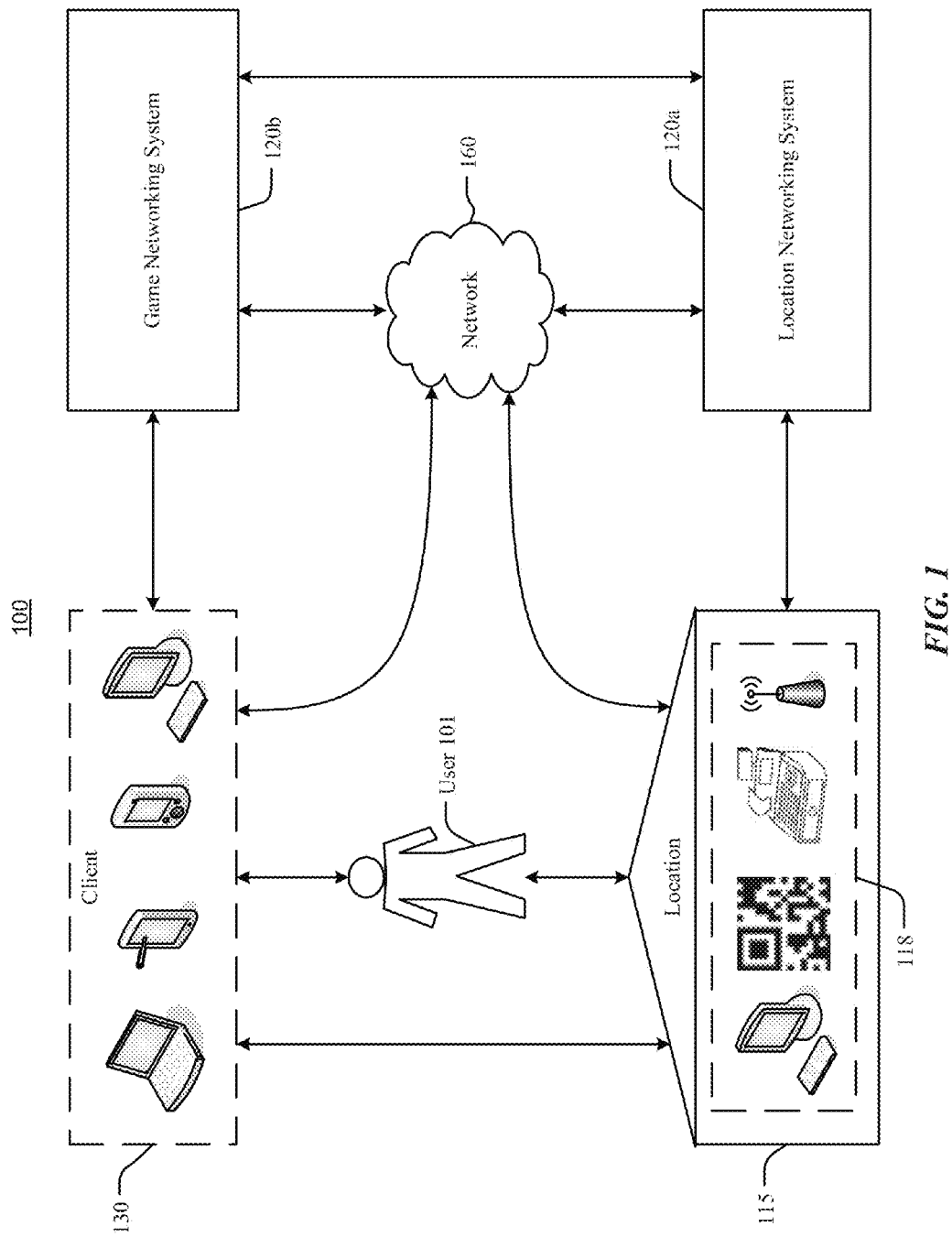
FIG. 1 illustrates an example of a system for implementing various disclosed embodiments.

FIG. 1 illustrates an example of a system for implementing various disclosed embodiments. In various embodiments, system 100 comprises User 101, location 115, verification system 118, location networking system 120a, gaming system 120b, client system 130, and network 160. The components of system 100 can be connected to each other in any suitable configuration, using any suitable type of connection. The components may be connected directly or over a network 160, which may be any suitable network (e.g., the Internet).

User 101 is a player of one or more online computer games. Game system 120b is a network addressable computing system that hosts the one or more online games. Game system 120b can generate, store, and transmit game account data and game state data associated with one or more users. An online game can be accessed by client system 130 directly, via network 160, or via a third-party system (e.g., a social networking site). Client system 130 can be any suitable computing device, such as a personal computer, laptop, cellular phone, smart phone, computing tablet, etc. Location 115 is a physical place that has one or more location attributes associated with it. User 101 can visit location 115 and perform one or more location-based actions there. Location 115 can contain one or more verification systems 118, which can verify if and when User 101 has performed a location-based action at location 115. Verification system 118 can generate, store, and transmit action verification data, which is data comprising information on one or more users and one or more location-based actions associated with the users. Location system 120a is a network addressable computing system that can receive, store, and transmit location attribute data, action verification data, and other data associated with location 115 and verification system 118. Location system 120a can be accessed by the other components in system 100 either directly or via network 160. In some embodiments, User 101 can physically bring his client system 130 to location 115 (e.g., if client system 130 is a smart phone). Client system 130 may then be able to interact directly with location 115 or verification system 118.

Game Systems

In an online game, a game engine manages the game state of the game. Game state comprises all in-game parameters, including player character state, non-player character (NPC) state, in-game assets and other virtual items, in-game obstacles, game parameters (e.g., internal game clocks, game environment), and other in-game elements or features. Each player controls one or more player characters (PCs). The game engine controls all other aspects of the game, including non-player characters (NPCs), in-game obstacles, and other game elements. The game engine also manages game state, including player character state for currently active (online) and inactive (offline) players.

A player character can have a set of attributes associated with the player character. As used herein, player character state can refer to one or more in-game attributes of a player character, such as in-game location, assets, levels, condition, health, status, inventory, skill set, name, orientation, affiliation, specialty, and so on. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character.

In various embodiments, an online game can provide a mechanism for player characters to acquire in-game assets, which are a type of virtual item or thing that provide some type of in-game benefit to a player character. In some embodiments, an in-game asset can provide an in-game benefit for the player character by improving the player character's state. The improved player character state could increase the player character's likelihood or ability to advance in the game, or otherwise improve game play. For example, in-game assets could be character levels, ability points, skill points, hit points, mana points, combat bonuses, etc. In-game assets can also be virtual representations of real life things such as cash, chattel, precious valuables, personal property, real property, weapons, vehicles, titles, jobs, etc. In-game assets can also include mythical and fantasy things, such as manna, magical items, potions, relics, artifacts, etc.

An online game can be hosted by game networking system 120b, which can be accessed using any suitable connection with an appropriate client system 130. A player may have a game account on game system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game system 120b can assign a unique identifier to each player of an online game hosted on game system 120b. Game system 120b can determine that a user is accessing the online game by reading the user's cookies, which may be appended to HTTP requests transmitted by client system 130, and/or by the user logging onto the online game.

Locations

As used herein, a location is a specific physical place in the real world. For example, location 115 could be a store, restaurant, mall, business office, building, park, street venue, library, etc. Location 115 can have various systems associated with it, including verification system 118 and location system 120a. As used herein, the operator of location 115 is the person or entity that owns, possesses, operates, or otherwise controls location 115. Furthermore, as used herein, a user of location 115 is a person who can enter, visit, use, purchase, or perform some other action at location 115. This can include past, present, and future users of location 115. In various embodiments; a player of an online game may also be a user of location 115.

In various embodiments, location 115 can have one or more devices for communicating with game system 120b. Verification system 118 or location system 120a can communicate with game system 120b, either directly or via network 160. In some embodiments, verification system 118 and location system 120a are part of the same computing system.

Location Attributes

In various embodiments, location 115 can have one or more attributes associated with it. These location attributes include a variety of details about location 115. Location attributes can include, for example: details regarding goods and services available at the location, such as the type, price, quantity, quality, brand, size, description, and other details of the goods and services available at the location; the purchase history of good and services at the location; corporate and intellectual property information of the location, such as any brands, trademarks, logos, and other such information associated with the location; the location-based action history of players of one or more online games at the location, such as the type of location-based actions, proposed location-based actions, performed location-based actions, and other information regarding location-based actions associated with the location; personal and demographic information of users of the location, such as name, sex, race, ethnicity, age, income, education, employment status, address, credit information, purchase history, and other personal or demographic information of the users of the location; geographic information of the location, such as the position, elevation, size, orientation, GPS coordinates, relation to other locations, local terrain, weather, and other geographic information of the location; and other descriptive information associated with the location.

In various embodiments, the location attributes of location 115 can be stored in a location account. The examples described herein assume that the location account is stored on location system 120a, however this is not intended to be limiting. The location account can be stored on any suitable data store, including location system 120a, game system 120b, a third-party system, a distributed data store, or any combination of two or more of the above.

In some embodiments, the location attributes of location 115 can be determined by accessing a website or other network addressable system that contains details about location 115. For example, a computing system can access a website associated with location 115, such as a corporate website or an online shopping catalog, and analyze the website for text, keywords, prices, concepts, meta tags, and other details associated with location 115.

User Identification

In various embodiments, location system 120a can identify users of location 115 by a variety of methods. The methods described below are not intended to be limiting, and one of ordinary skill in the art would recognize that other methods can be used to identify a user.

In some embodiments, location system 120a can identify a user when the user purchases an item at location 115. When a user purchases an item at location 115, location system 120a may collect purchase information from the user, including the user's name, credit card number, billing address, shipping address, email address, etc. For example, if User 101 visits a store and purchases an item with a credit card, location system 120*a* could use the information contained on the credit card to identify User 101.

In some embodiments, location system 120*a* can identify a user based on some form of identification presented by the user at location 115. A user could present a membership card, discount card, coupon, ticket, code, driver's license, passport, or other item that contains identifying information about the user at location 115. For example, User 101 may have a ticket with a scannable QR code that contains identifying information. The ticket can be scanned at location 115, thereby allowing location system 120*a* to identify User 101.

In some embodiments, location system 120*a* can identify a user based on the user's proximity to location 115. A user's proximity can be determined using various devices or applications, such as a GPS device, a social networking site (e.g., Facebook, Twitter), a location tracking site (e.g., Foursquare, Google Latitude), a location reservation site (e.g., OpenTable, Expedia), etc. Location system 120*a* could then access this proximity information to identify the user. For example, if User 101 enters a store, he could access Foursquare via any suitable computing device to indicate that he is at the store, and Foursquare could transmit this information to location system 120*a*, thereby informing it that User 101 is at the store. In another example, location 115 could have a QR code printed inside the location, which User 101 could photograph with a mobile client system 130 (e.g., a smart phone) and transmit to location system 120*a*. In yet another example, if User 101 makes a reservation to dine at a restaurant on OpenTable, location system 120*a* could identify User 101 when he checks in with the maître d' at the restaurant.

In some embodiments, location system 120*a* can identify a user when the user provides an indication of the user's presence at location 115. A user could check-in with a host, log-in to a computing device, activate a button or switch, or perform some other type of action to indicate the user's presence at location 115, which could then be transmitted to location system 120*a*. For example, if User 101 visits a hotel, location system 120*a* could identify User 101 when he checks in with the hotel clerk. In another example, if User 101 accesses a computing system at location 115, location system 120*a* could identify User 101 when he logs into the computing system.

In some embodiments, location system 120*a* or game system 120*b* or can identify a user based on a search engine query made by the user. For example, if User 101 queries a search engine (e.g., Google or Yahoo) that has information that identifies User 101, that information can be transmitted to location system 120*a* or game system 120*b* along with any other relevant information (e.g., the search query made by User 101) so either system could to identify User 101.

In some embodiments, while identifying a user, location system 120*a* may also collect information related to one or more game accounts associated with the user, including any unique game account identifiers assigned to the user. For example, User 101 may gain entrance to location 115 by presenting a ticket with a scannable QR code, which contains information identifying User 101 and information about. User 101's unique identifier on an online game. After this ticket is scanned at location 115, the identifying information can be transmitted to location system 120*a*.

In some embodiments, location system 120*a* can assign a unique identifier to each user of location 115. Location system 120*a* can assign a username, identification number, or other unique identifier. Location system 120*a* can also utilize any unique identifier assigned to the user by game system 120*b*.

Offering Incentive Rewards for Performing Location-Based Actions

A user of an online game hosted by game system 120*b* can also be a user of location 115. Location operators may find it desirable to provide some type of incentive to encourage these users to perform one or more location-based actions. Some users may be incentivized to perform certain location-based actions when offered an in-game asset for an online game. As used herein, an incentive reward is an in-game asset in an online game that is offered to a user of the online game for completing one or more location-based actions. For example, the incentive reward could be a specific in-game asset (e.g., a Sword of Destruction +5) that provides a particular in-game benefit (e.g., increasing a player character's ability to defeat in-game opponents). As used herein, a location-based action is a type of action that can be performed at one or more locations by a user of an online game, wherein the action is proposed to the user as part of an offer for an incentive reward. For example, a location-based action could be entering, visiting, using, purchasing, or performing some other action at location 115.

In some embodiments, a distributor or manufacturer of an item can incentivize users of an online game to purchase the item from a location. For example, the distributor or manufacturer of a specific soft drink may offer an in-game incentive for purchasing a can of the soft drink from any location. While this disclosure generally discusses location-based actions with respect to a location, the embodiments disclosed herein are also applicable to location-based actions with respect to a distributor or manufacturer of an item, unless context suggests otherwise.

Incentive Rewards

An incentive reward is an in-game asset in an online game hosted by game system 120*b* that is offered to a user of the online game for completing one or more location-based actions. An incentive reward could be, for example, game points, virtual currency, experience points, character levels, character attributes, virtual items, or other in-game assets.

Incentive Offer Search Systems

In various embodiments, game system 120*b* can include an incentive offer search system, which is a network addressable computing system that is operative to generate and/or select an incentive reward in response to a request from another computing system, such as location system 120*a*, game system 120*b*, or client system 130. The incentive offer search system may be a central system accessible to one or more systems over a wide area network, or a local system accessible to a single domain. The present disclosure assumes the incentive offer search system is a subsystem of game system 120*b*, however it is possible that the incentive offer search system is part of location system 120*a* or even an independent remote system.

In one embodiment, the incentive offer search system includes one or more physical servers and an incentive offer data store. The incentive offer data store can store content information containing incentive offer creative content and URLs or identifiers to content or other resources hosted by game system 120*b* or location system 120*a*. The content may be stored in association with a game engine or game account information on game system 120*b*.

In various embodiments, the incentive offer search system determines an appropriate incentive reward to offer to a user for performing one or more location-based actions. The incentive reward can be determined by a variety of methods (e.g., statically, randomly, dynamically).

In some embodiments, the incentive reward can be determined statically, such that the incentive reward offered is the same for all users. For example, User 101 might be offered an incentive reward of $20,000 in virtual poker chips for purchasing a lawnmower at location 115, and this same incentive reward would be offered to all other users.

In some embodiments, the incentive reward can be determined dynamically, such that the incentive reward offered may vary based on a variety of factors. For example, the incentive reward can be determined based on location attributes, game state, or other parameters.

Determining Incentive Rewards Based on Game State

In various embodiments, the incentive offer search system can determine an appropriate incentive reward based on game state data stored on game system 120b. The incentive offer search system can access the user's game account to retrieve various game state data (e.g., the games played by the user, the user's player character state) and then identify an incentive reward appropriate for that user based on that data.

In some embodiments, the incentive offer search system can consider thematic, topical, or categorical relationships between a possible incentive reward and a game state variable to determine an appropriate incentive reward. For example, the incentive offer search system may query game system 120b to determine that User 101 is a player in Zynga Dragon Wars and that User 101's player character is a 5th level elf. The incentive offer search system may then determine that an Elven Invisibility Cloak is an appropriate incentive reward for a 5th level elf based on the thematic relationship between and player character's race and the incentive reward.

In some embodiments, the incentive offer search system can consider player character state, such as in-game assets and other attributes of a player character, to determine an appropriate incentive reward. For example, if User 101 has $25,000 in virtual poker chips in Zynga Poker, the incentive offer search system may determine that an incentive reward of $10,000 in virtual poker chips is appropriate, but if User 101 has $100,000 in virtual poker chips, an incentive reward of $30,000 may be determined appropriate based on his current in-game assets, wherein the incentive reward is scaled to User 101's current in-game assets. In another example, if User 101 has five purple gems and zero orange gems in Zynga Treasure Isle, the incentive offer search, system may determine that two orange gems is an appropriate incentive reward for User 101 based on his current in-game assets, wherein the incentive reward is selected so that User 101 is not offered a redundant in-game asset.

In some embodiments, where a user plays more than one game hosted by game system 120b, the incentive offer search system can generate incentive rewards corresponding to one or more of the games. Game system 120b can host a plurality of online games, and a particular user may play one or more of these games and control one or more player characters in each game. If the user plays more than one game on game system 120b, the incentive offer search system may generate an incentive reward corresponding to one or more of these games. The incentive offer search system can determine which games to generate incentive rewards for by examining the user's game account information with respect to each game and analyzing a variety of factors (e.g., the user's frequency of play, duration of play, play preferences, social network information). In a particular embodiment, the incentive offer search system can generate an incentive reward for one game from the plurality of games. For example, if User 101 plays Zynga Poker on average ten hours a week, but only plays Zynga Mafia Wars on average five hours per week, the incentive offer search system may determine that User 101 prefers playing Zynga Poker and may only generate an incentive reward for that game. Alternatively, the incentive offer search system may generate an incentive reward for Zynga Mafia Wars instead as a means of encouraging User 101 to increase his game play time in that game. The offer search system may also consider a user's social network information for multiuser online games that interface with social networking systems. For example, if User 101 has twenty friends who play Zynga Poker but fifty friends who play Zynga Mafia Wars, the incentive offer search system may determine that User 101 prefers playing Zynga Mafia Wars and only generate an incentive reward for that game.

In some embodiments, the incentive offer search system can generate incentive rewards for two or more games. In one embodiment, the incentive offer search system can generate incentive rewards for a plurality of games. For example, if User 101 plays both Zynga Poker and Zynga Mafia Wars, the offer search system may offer an incentive reward of $10,000 in virtual poker chips (for Zynga Poker) and a virtual submachine gun (for Zynga Mafia Wars). In another embodiment, the incentive offer search system can generate incentive rewards for a plurality of games, but the offer requires the user to choose which game he wants to receive the incentive reward in. For example, using the previous example, the incentive offer search system might offer User 101 an incentive reward of $10,000 in virtual poker chips and a virtual machine gun, but require User 101 to choose which of the two rewards he wants. In yet another embodiment, the incentive offer search system can generate a single incentive reward that can be used in a plurality of games. For example, in a variation of the previous example, the incentive offer search system might offer User 101 an incentive reward of $10,000 in virtual cash, wherein this cash can be used in either Zynga Poker or Zynga Mafia Wars.

In some embodiments, the offer search system can generate an incentive reward for a game hosted by game system 120b that a user has never played or that has no game account associated with the user. An incentive reward for an unplayed game can be generated even if the user plays other games on game system 120b. For example, if User 101 has only played Zynga Poker on game system 120b, the incentive offer search system may generate an incentive reward for another game hosted by game system 120b (e.g., Zynga Mafia Wars, Zynga YoVille) to encourage User 101 to try a new game.

Figure 2A:
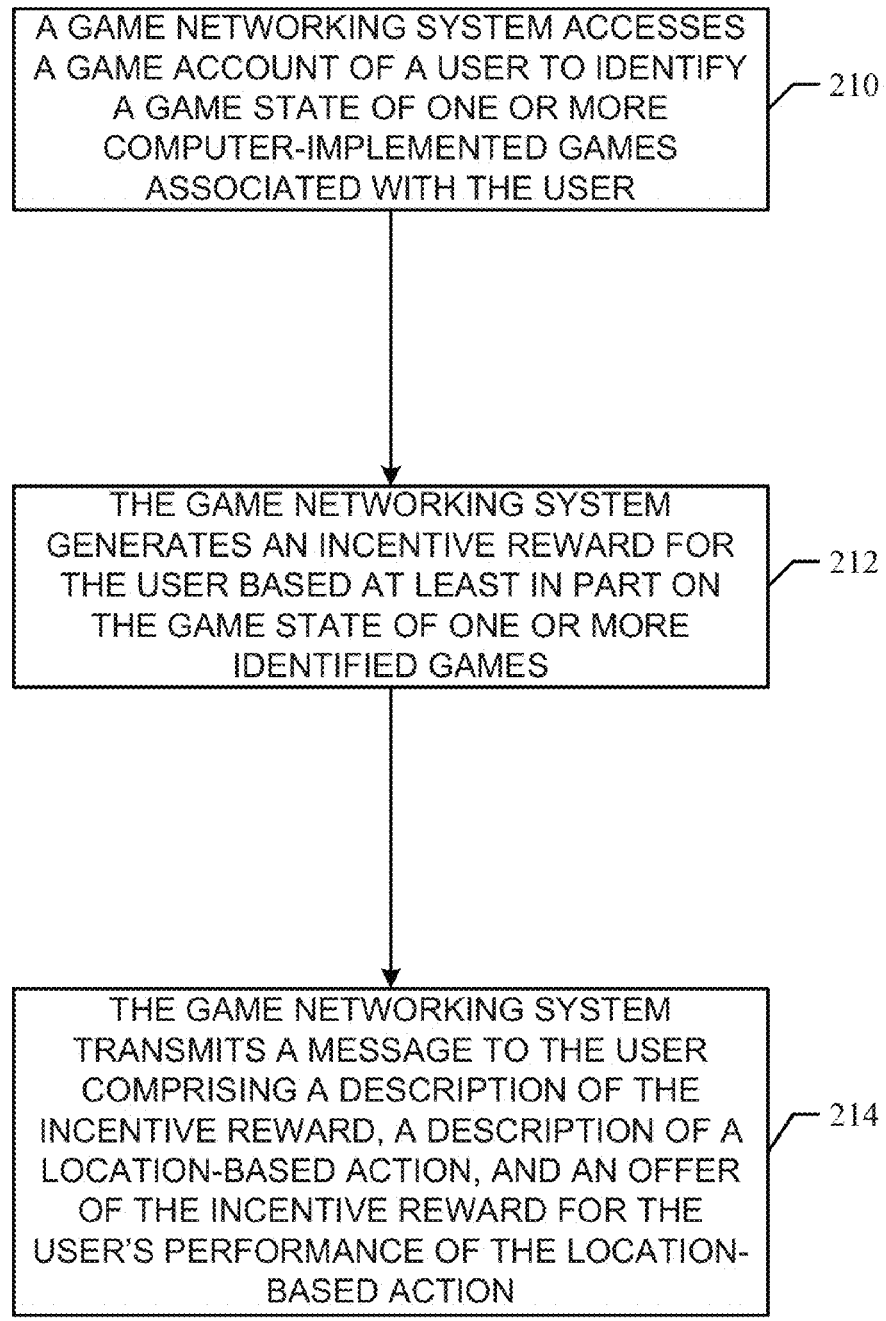
FIG. 2A shows a flowchart illustrating an example method for generating an incentive reward based on game state.

FIG. 2A shows a flowchart illustrating an example method for generating an incentive reward based on game state. In various embodiments, game networking system 120b accesses a game account of a user to identify one or more computer-implemented games associated with the user at step 210. Game networking system 120b then generates an incentive reward for the user based at least in part on the game state of the one or more identified games at step 212. The game networking system 120b then transmits a message to the user comprising a description of the incentive reward, a description of a location-based action, and an offer of the incentive reward for the user's performance of the location-based action at step 214. The example method illustrated in FIG. 2A and described above is provided for illustration purposes only and is not meant to be limiting. One of ordinary skill in the art would appreciate that the steps described above can be performed in any reasonable order, and that various steps can be reordered, added, and removed.

Determining Incentive Rewards Based on Location Attributes

In various embodiments, the incentive offer search system can determine an appropriate incentive reward based on location attribute data. The location attributes of location 115 can be stored in a location account, which can be stored and accessed on any suitable computing system, including location system 120a, game system 120b, a third-party system, distributed computing system, or any combination of two or more of the above. The incentive offer search system can access location 115's location account to retrieve various location attribute data (e.g., the goods and services available at the location, personal and demographic information of users of the location) and then identify an incentive reward appropriate for a user based on that data.

In some embodiments, the incentive offer search system can consider thematic, topical, or categorical relationships between a possible incentive reward and a location attribute to determine an appropriate incentive reward. For example, the incentive offer search system may query the location account associated with location 115 to determine that location 115 is a grocery store with organic strawberries on sale. The incentive offer search system may then determine that 100 servings of virtual strawberry shortcake in Zynga Café World is an appropriate incentive reward for performing a location-based action at location 115 based on the thematic relationship between and goods available at location 115 and the incentive reward.

In some embodiments, the incentive offer search system can consider details of the goods or services available at the location to determine an appropriate incentive reward to offer. This can include the type, price, quantity, quality, brand, size, description, and other details of the goods and services available at location 115. For example, the incentive reward for purchasing a toaster from a particular appliance store might be a virtual toaster in Zynga YoVille. In one embodiment, the incentive reward may improve based on the price of the item. For example, the incentive reward for a $50 boombox may be $5000 in virtual poker chips in Zynga Poker, but the incentive reward for a $1000 home stereo system may be $200,000 in virtual poker chips.

In some embodiments, the incentive offer search system can consider any brands, trademarks, logos, and other corporate or intellectual property information associated with the location to determine an appropriate incentive reward. For example, if location 115 is a Sears department store, the incentive offer search system may determine that a virtual item affixed with the Sears logo is an appropriate incentive reward for performing a location-based action at the location.

In some embodiments, the incentive offer search system can consider personal and demographic information of users of the location to determine an appropriate incentive reward. This can included the name, sex, race, ethnicity, age, income, education, employment status, address, credit information, purchase history, and other personal or demographic information of the users of the location. For example, if User 101 is female, the incentive offer search system may determine that a virtual Barbie doll in Zynga YoVille is an appropriate incentive reward for User 101 based on her sex.

In some embodiments, the incentive offer search system can consider the purchase history of goods and services at the location to determine an appropriate incentive reward. For example, if visitors to location 115 often buy fertilizer, the incentive offer search system may determine that five applications of fertilizer in Zynga FarmVille is an appropriate incentive reward for performing a location-based action at location 115 based on the purchase history there.

In some embodiments, the incentive offer search system can consider the location-based action history of players of one or more online games at the location to determine an appropriate incentive reward. This can include the type of location-based actions, proposed location-based actions, performed location-based actions, and other information regarding location-based actions associated with the location. For example, if some users often fail to perform a certain location-based action when offered an incentive reward of $10,000 in virtual poker chips in Zynga Poker, the incentive offer search system may determine an incentive reward of $30,000 in virtual poker chips is an appropriate incentive reward to incentivize performance of this location-based action.

In some embodiments, the incentive offer search system can consider the geographic information of the location to determine an appropriate incentive reward. This can include the position, elevation, size, orientation, GPS coordinates, relation to other locations, local terrain, weather, and other geographic information of the location. For example, if location 115 is near a beach, the incentive offer search system may determine that a virtual beach towel in Zynga Treasure Isle is an appropriate incentive reward for performing a location-based action at location 115.

Figure 2B:
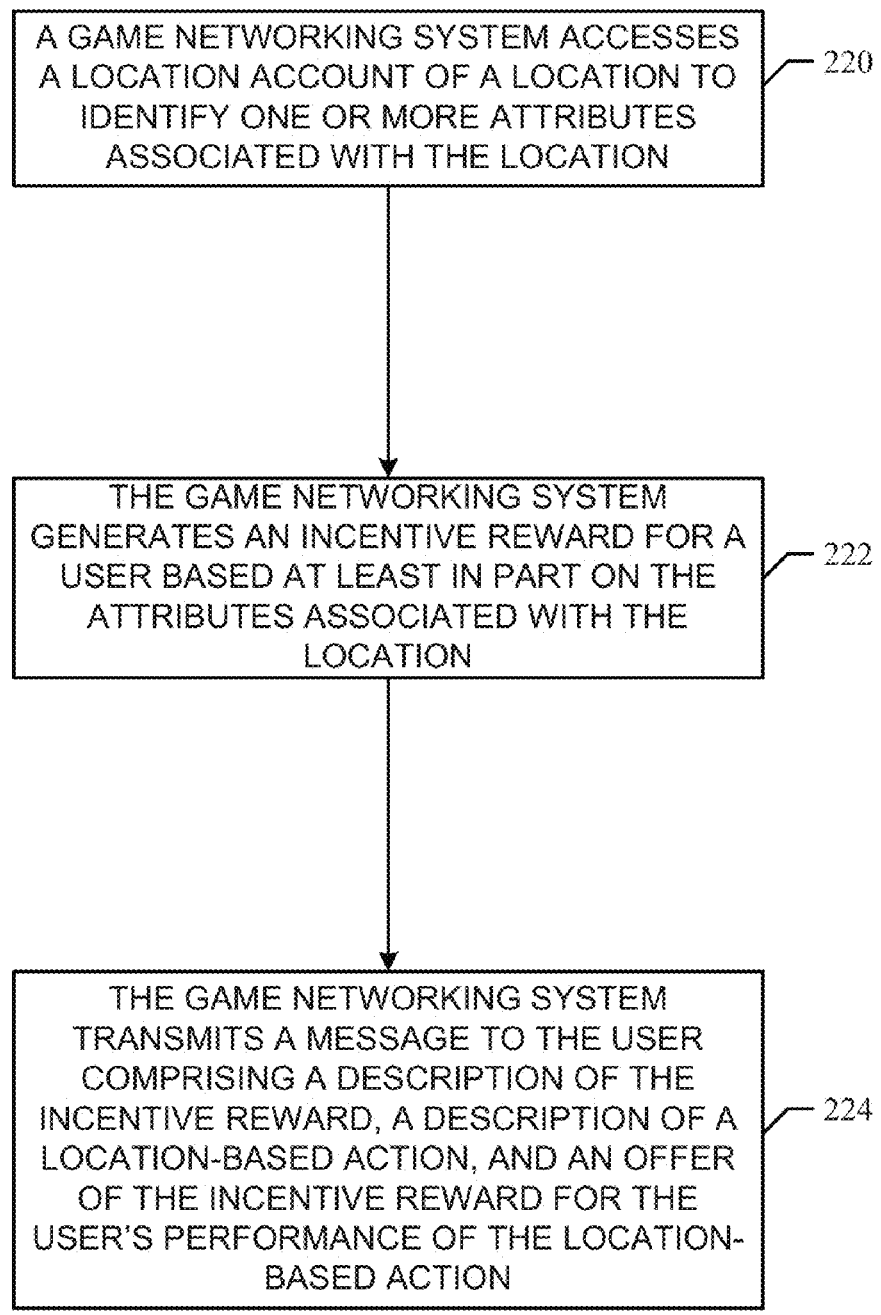
FIG. 2B shows a flowchart illustrating an example method for generating an incentive reward based on location attributes.

FIG. 2B shows a flowchart illustrating an example method for generating an incentive reward based on location attributes. In various embodiments, game networking system 120b accesses a location account of location 115 to identify one or more attributes associated with location 115 at step 220. Game networking system 120b then generates an incentive reward for a user based at least in part on the attributes associated with location 115 at step 222. The game networking system 120b then transmits a message to the user comprising a description of the incentive reward, a description of a location-based action, and an offer of the incentive reward for the user's performance of the location-based action at step 224. The example method illustrated in FIG. 2B and described above is provided for illustration purposes only and is not meant to be limiting. One of ordinary skill in the art would appreciate that the steps described above can be performed in any reasonable order, and that various steps can be reordered, added, and removed.

Determining Incentive Rewards Based on Other Factors

In various embodiments, the incentive offer search system can determine an appropriate incentive reward based on factors other than game state or location attributes.

In some embodiments, the incentive reward can be determined based in part on the location-based action generated by the action proposal search system. For example, if the action proposal search system generates a location-based action for User 101 of buying a barbecue from a specific hardware store, the incentive offer search system may determine that a virtual super oven in Zynga Café World is an appropriate incentive reward based on the thematic relationship between the incentive reward and the location-based action. In another example, the incentive reward for purchasing a bottle of Coca-cola from any location might be a virtual item affixed with a Coca-cola logo.

In some embodiments, the incentive reward for performing a location-based action can vary over time. The incentive offer search system may generate multiple possible incentive rewards, wherein the actual reward received by the user is based on when the location-based action is completed. For example, an incentive reward for purchasing a lawnmower at location 115 within the next hour may be $20,000 in virtual poker chips, but the incentive reward may decrease to only $10,000 in virtual poker chips if the lawnmower is purchased afterwards. In one embodiment, the incentive reward may only be offered for a limited time. For example, an incentive reward of a virtual sports car might only be offered to the first one hundred users who purchase a toaster from location 115. In a variation of this embodiment, the incentive reward may become less attractive for subsequent purchasers. For example, the first user to purchase a toaster from location 115 will get a virtual Porsche 911, while later users will be offered virtual Ford Pintos. The incentive offer search system may present offers, such that it is not apparent to the user of the gaming system whether he will get the better item or not. For example, User 101 might be presented with an offer that states, "Limited time offer! The first person to buy a toaster today will receive a virtual Porsche 911 in Zynga YoVille (subsequent buyers will receive a virtual Ford Pinto)." In this case, the user viewing this offer may not know whether he will be the first purchaser and may only find out after the item is purchased (e.g., when handed the receipt for the purchase).

In some embodiments, the incentive offer search system can generate an incentive reward that is only a percentage chance of receiving an in-game asset. For example, an incentive reward could be a specific percentage chance (e.g., 20%, 40%, 75%) to receive a particular in-game asset (e.g., a virtual Porsche 911). After the user has earned the incentive reward, game system 120b could then determine if the user actually receives the in-game asset.

In some embodiments, the incentive offer search system may generate an incentive reward for an unknown or undisclosed in-game asset. For example, the incentive offer search system may generate an incentive reward for a "mystery prize" for User 101 and present an offer that states "Purchase this item at location 115 now and receive a mystery prize in Zynga Dragon Wars!" The user may not discover what the "mystery prize" is until the incentive reward is earned by performing an associated location-based action, or possibly even later (e.g., the next time the user logs into game system 120b).

Location-Based Actions

A location-based action is a type of action that can be performed at location 115 by a user of an online game hosted by game system 20b, wherein the action is proposed to the user as part of an offer for an incentive reward. A location-based action could be, for example, entering, visiting, using, purchasing, or performing some other action at location 115.

Action Proposal Search Systems

In various embodiments, game system 120b can include an action proposal search system, which is a network addressable computing system that is operative to generate and/or select a location-based action in response to a request from another computing system, such as location system 120a, game system 120b, or client system 130. The action proposal search system may be a central system accessible to one or more systems over a wide area network, or a local system accessible to a single domain. The present disclosure assumes the action proposal search system is a subsystem of game system 120b, however it is possible that the action proposal search system is part of location system 120a or even an independent remote system.

In one embodiment, the action proposal search system includes one or more physical servers and an action proposal data store. The action proposal data store can store content information containing action proposal creative content and URLs or identifiers to content or other resources hosted by game system 120b or location system 120a. The content may be stored in association with game account information or location account information on game system 120b.

In various embodiments, the action proposal search system determines an appropriate location-based action to propose to a user in exchange for one or more incentive rewards. The location-based action can be determined by a variety of methods (e.g., statically, randomly, dynamically, etc.).

In some embodiments, the location-based action can be determined statically, such that the location-based action offered is the same for all users. For example, the action proposal search system may propose that User 101 purchase a cup of coffee at location 115 in exchange for an incentive reward of $100 in virtual cash, and this same location-based action would be proposed to all other users.

In some embodiments, the location-based action can be determined dynamically, such that the location-based action proposed may vary based on a variety of factors. For example, the location-based action can be determined based on location attributes, game state, or other parameters.

Determining Location-Based Actions Based on Game State

In various embodiments, the action proposal search system can determine an appropriate location-based action based on game state data on game system 120b. The action proposal search system can access the user's game account to retrieve various game state data (e.g., the games played by the user, the user's player character state) and then identify a location-based action appropriate for that user based on that data.

In some embodiments, the action proposal search system can consider thematic, topical, or categorical relationships between a possible location-based action and a game state variable to determine an appropriate location-based action. For example, the action proposal search system may query game system 120b to determine that User 101 is a player in Zynga FarmVille and that User 101's player character has a virtual barn, the action proposal search system may then determine that visiting a particular barn at the Sonoma County Fair is an appropriate location-based action for the user based on the thematic relationship between User 101's virtual barn and the proposed location.

In some embodiments, the action proposal search system can consider player character state, such as in-game assets and other attributes of a player character, to determine an appropriate location-based action. For example, if User 101 has $25,000 in virtual poker chips in Zynga Poker, the action proposal search system may determine that playing a hand of real poker in Las Vegas at a $10 limit table is appropriate, but if User 101 has $100,000 in virtual poker chips, playing five hands of real poker at a $50 limit table may be determined appropriate based on User 101's current in-game assets. In another example, if User 101 has a virtual barn with no virtual chickens in it in Zynga FarmVille, the action proposal search system may determine that visiting the chicken coop at the Sonoma County Fair is an appropriate location-based action for User 101 based on his current in-game assets.

In some embodiments, where a user plays more than one game hosted by game system 120b, the action proposal search system can generate location-based actions corresponding to one or more of the games. Game system 120b can host a plurality of online games, and a particular user may play one or more of these games and control one or more player characters in each game. If the user plays more than one game on game system 120b, the action proposal search system may generate a location-based action corresponding to one or more of these games. The action proposal search system can determine which games to generate location-based actions for by examining the user's game account information with respect to each game and analyzing a variety of factors (e.g., the user's frequency of play, duration of play, play preferences, social network information). For example, the action proposal search system may determine that buying a cup of coffee from a specific café is an appropriate location-based action to receive an incentive reward in Zynga Café World. In another example, the action proposal search system may determine that donating $10 to an animal cruelty charity is an appropriate location-based action to receive an incentive reward in Zynga FarmVille.

Figure 2C:
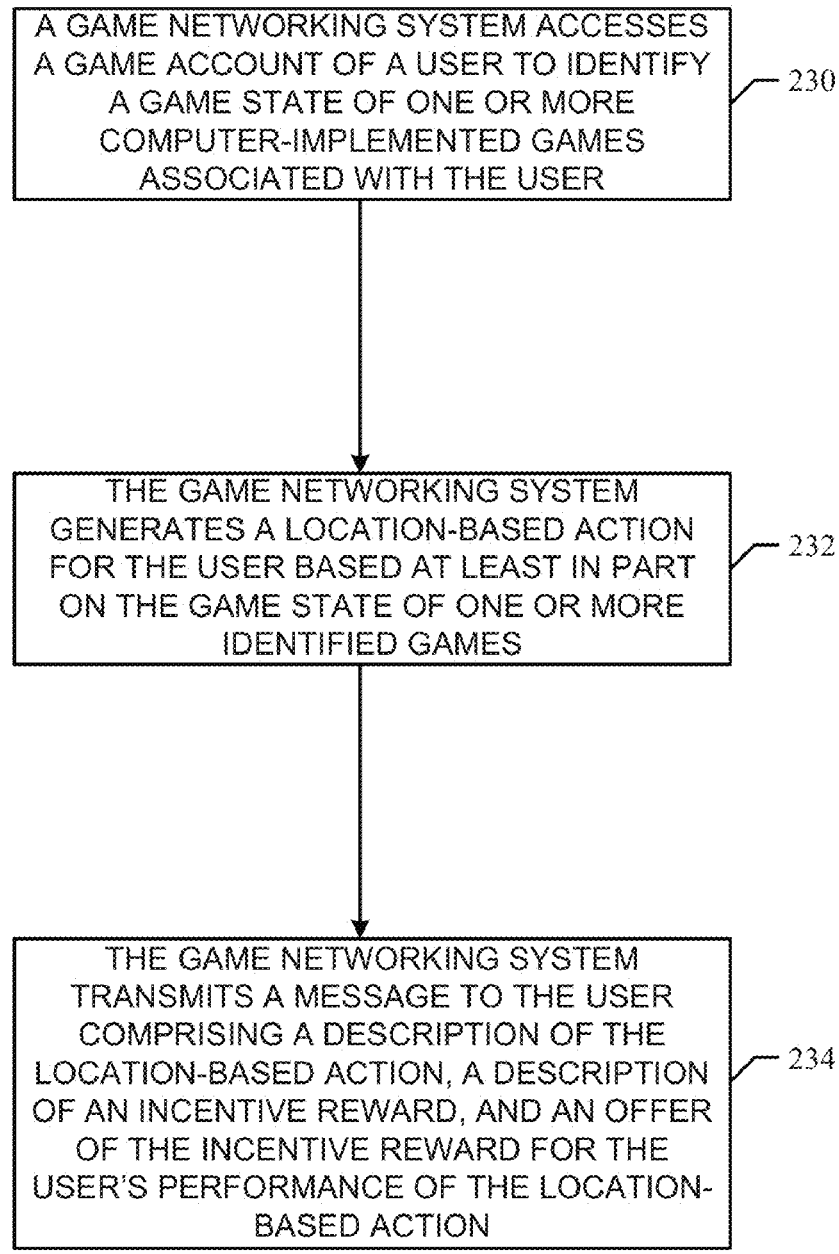
FIG. 2C shows a flowchart illustrating an example method for generating a location-based action based on game state.

FIG. 2C shows a flowchart illustrating an example method for generating a location-based action based on a game state. In various embodiments, game networking system 120b accesses a game account of a user to identify one or more computer-implemented games associated with the user at step 230. Game networking system 120b then generates a location-based action for the user based at least in part on the game state of the one or more identified games at step 232. Game networking system 120b then transmits a message to the user comprising a description of the location-based action, a description of an incentive reward, and an offer of the incentive reward for the user's performance of the location-based action at step 234. The example method illustrated in FIG. 2C and described above is provided for illustration purposes only and is not meant to be limiting. One of ordinary skill in the art would appreciate that the steps described above can be performed in any reasonable order, and that various steps can be reordered, added, and removed.

Determining Location-Based Actions Based on Location Attributes

In various embodiments, the action proposal search system can determine an appropriate location-based action based on location attribute data. The location attributes of location 115 can be stored in a location account, which can be stored and accessed on any suitable computing system, including location system 120a, game system 120b, a third-party system, a distributed computing system, or any combination of two or more of the above. The action proposal search system can access location 115's location account to retrieve various location attribute data (e.g., the good and services available at the location, personal and demographic information of users of the location, etc.) and then identify a location-based action appropriate for a user based on that data.

In some embodiments, the action proposal search system can consider thematic, topical, or categorical relationships between a possible location-based action and a location attribute to determine an appropriate location-based action. For example, the action proposal search system may query the location account associated with location 115 to determine that location 115 is a grocery store with organic strawberries on sale. The incentive offer search system may then determine that buying a basket of organic strawberries is an appropriate location-based action to perform at location 115 based on the categorical relationship between the goods available at location 115 and the location-based action.

In some embodiments, the action proposal search system can consider details of the goods or services available at the location to determine an appropriate location-based action. This can include the type, price, quantity, quality, brand, size, description, and other details of the goods and services available at the location. For example, if location 115 is an amusement park, the action proposal search system may determine that riding a specific roller coaster is an appropriate location-based action based on the type of services available there. In particular embodiments, the action proposal search system can generate a location-based action to incentivize the purchase of particular goods or services, such as buying items that are on sale or items the location operator wants to clear from inventory. The location operator can provide preferences for the items that it wants associated with location-based offers, or the action proposal search system can query the location account and analyze the location's current inventory to dynamically determine an appropriate item. For example, if location 115 is an ice cream shop with an oversupply of vanilla ice cream, the action proposal search system may determine that purchasing a scoop of vanilla ice cream at location 115 is an appropriate location-based action based on the inventory of goods available there.

In some embodiments, the action proposal search system can consider any brands, trademarks, logos, and other corporate or intellectual property information associated with the location to determine an appropriate location-based action. For example, if the operator of location 115 has a patent on a certain method, the action proposal search system may determine that performing that patented method is an appropriate location-based action.

In some embodiments, the action proposal search system can consider personal and demographic information of users of the location to determine an appropriate location-based action. This can include the name, sex, race, ethnicity, age, income, education, employment status, address, credit information, purchase history, and other personal or demographic information of the users of the location. For example, if a particular user of location 115 is a mechanical engineer, the action proposal search system may determine that purchasing a textbook on thermodynamics at location 115 is an appropriate location-based action based on the user's employment information. In another example, if User 101 has never purchased a sandwich from location 115, the action proposal search system may determine that purchasing a sandwich from location 115 is an appropriate location-based action for User 101 based on his purchase history. In yet another example, if User 101 is 18-years old, the action proposal search system may propose to the user to purchase a can of soda, but if User 101 is 22-years old, the action proposal search system may propose to the user to purchase a bottle of scotch.

In some embodiments, the action proposal search system can consider the purchase history of goods and services at the location to determine an appropriate location-based action. For example, if visitors to location 115 rarely buy a particular item, the action proposal search system may determine that purchasing that item at location 115 is an appropriate location-based action based on the purchase history of that item, wherein the location-based action is selected to incentivize purchase of that item.

In some embodiments, the action proposal search system can consider the location-based action history of players of one or more online games at the location to determine an appropriate location-based action. This can include the type of location-based actions, proposed location-based actions, performed location-based actions, and other information regarding location-based actions associated with the location. For example, if a small fraction of users perform a certain location-based action, such as playing at a high-stakes poker table at a particular casino, the action proposal search system may determine that an easier version of that location-based action is an appropriate location-based action, such as playing at a lower-stakes poker table. In another example, if User 101 has never visited Bozo's Amusement Park, the action proposal search system can propose that User 101 purchase a summer pass. If User 101 has already visited Bozo's Amusement Park, and it had already been proposed to User 101 to purchase a summer pass, the action proposal search system can propose that User 101 purchase cotton candy inside the park. In a particular embodiment, the action proposal search system can determine a location-based action based on any previous actions that have been proposed to the user based on locations besides the one that is currently specified. For example, if the action proposal search system had previously proposed that the user buy a grill at a general store, the action proposal search system could then propose that the user purchase steaks or hotdogs at a supermarket.

In some embodiments, the action proposal search system can consider the geographic information of the location to determine an appropriate location-based action. This can include the position, elevation, size, orientation, GPS coordinates, relation to other locations, local terrain, weather, and other geographic information of the location. For example, if location 115 is a store that sells bread and the store is near a duck pond, the action proposal search system may determine that purchasing bread and feeding the ducks is an appropriate location-based action based on the geographic information of location 115. In one embodiment, the action proposal search system can determine a location-based action based on the local terrain. For example, if location 115 is near a beach, the action proposal search system may determine that purchasing a swimsuit from location 115 is an appropriate location-based action based on the proximity of the location to the beach. In another embodiment, the action proposal search system can consider the current weather at the location. For example, if the current temperature at an amusement park is 90° F., the action proposal search system may determine that riding a water slide at the park is an appropriate location-based action based on the current weather there. In yet another embodiment, the action proposal search system can consider the historical weather at the location. For example, if the daytime temperature outside location 115 is typically 50° F. in the winter, the action proposal search system may determine that purchasing a sweatshirt at location 115 in the winter is an appropriate location-based action based on the historical weather there.

Figure 2D:
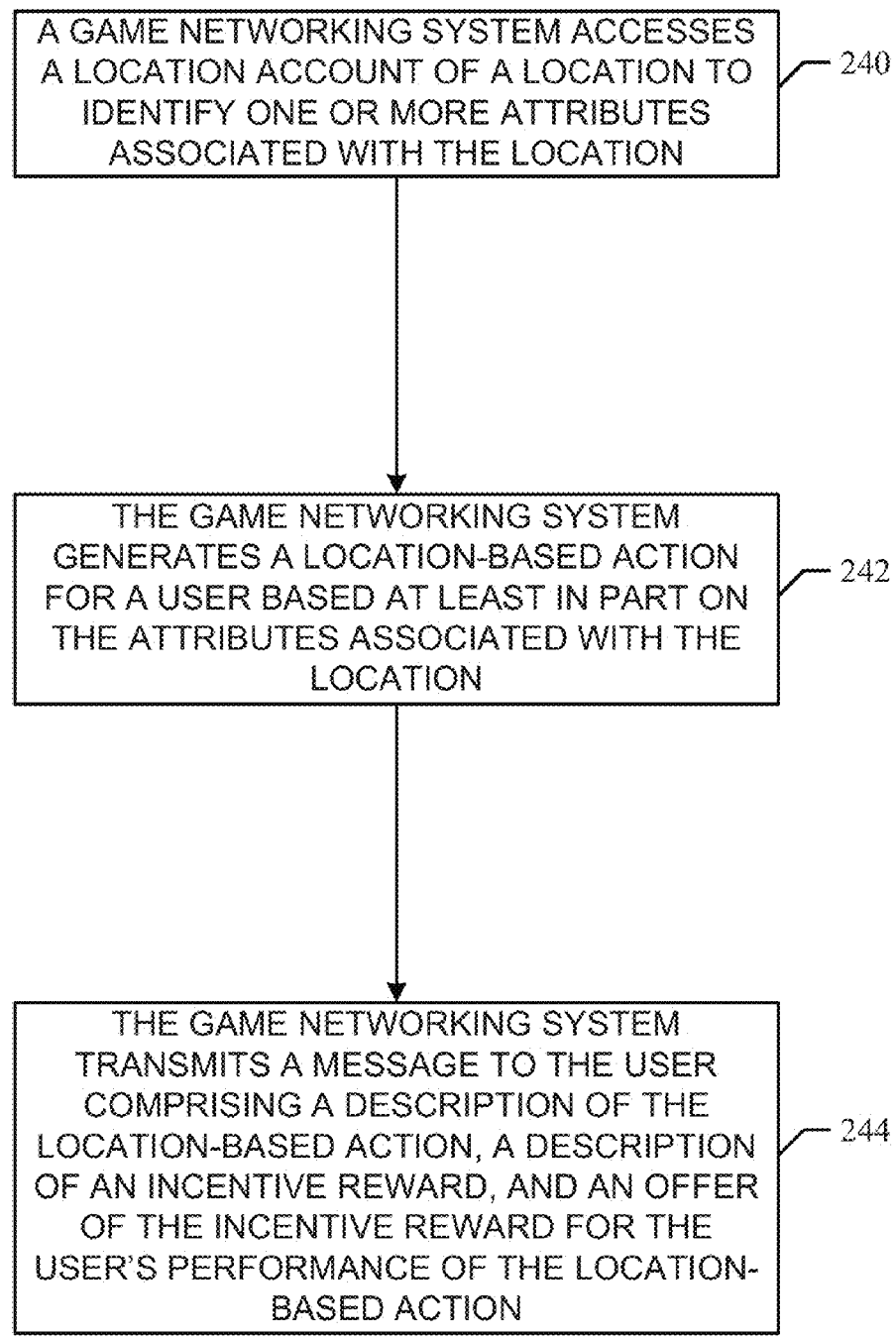
FIG. 2D shows a flowchart illustrating an example method for generating a location-based action based on location attributes.

FIG. 2D shows a flowchart illustrating an example method for generating a location-based action based on location attributes. In various embodiments, game networking system 120*b* accesses a location account of location 115 to identify one or more attributes associated with location 115 at step 240. Game networking system 120*b* then generates a location-based action for a user based at least in part on the attributes associated with location 115 at step 242. Game networking system 120*b* then transmits a message to the user comprising a description of the location-based action, a description of an incentive reward, and an offer of the incentive reward for the user's performance of the location-based action at step 244. The example method illustrated in FIG. 2D and described above is provided for illustration purposes only and is not meant to be limiting. One of ordinary skill in the art would appreciate that the steps described above can be performed in any reasonable order, and that various steps can be reordered, added, and removed.

Determining Location-Based Actions Based on Other Factors

In various embodiments, the action proposal search system can determine an appropriate location-based action based on factors other than game state or location attributes.

In some embodiments, the location-based action can be determined based in part on the incentive reward generated by the incentive offer search system. For example, if the incentive offer search system generates a virtual ice cream machine as an incentive reward for User 101, the action proposal search system may determine that buying a quart of premium ice cream from a specific grocery store is an appropriate location-based action based on the thematic relationship between the incentive reward and the location-based action.

In some embodiments, the incentive reward for performing a location-based action can vary over time. The action proposal search system may generate multiple possible location-based actions, wherein the location-based action the user has to perform to receive an incentive reward is based on when the location-based action is completed. For example, the action proposal search system may determine that swimming 10 laps at a particular swimming pool is an appropriate location-based action in the summer, but may determine that visiting an ice rink is an appropriate location-based action in the winter. In another example, the difficulty of the location-based action may vary over time. User 101 may have to swim 10 laps in a swimming pool if the location-based action is performed within two hours of being generated by the action proposal search system, but after two hours User 101 may have to swim 50 laps.

Presenting Incentive Reward Offers to Users

A variety of methods can be used to determine and present incentive reward offers to a user. In one embodiment, User 101 can access, via the user's client system 130, an online game hosted by game system 120*b*. The user's browser client can load and render the content of the webpage. Game system 120*b* may also access the user's game account information and/or the location account of one or more locations. This account information may be accessed in a variety of ways. For example, game system 120*b* could access data stored in a cookie on client system 130 that is appended to messages transmitted from client system 130 to game system 120*b*. This allows game system 120*b* to identify User 101 and access the appropriate game account information. To access location account information, game system 120*b* may directly query location system 120*a*. Alternatively, the online game webpage may include code (e.g., HTML, etc.) instructing the client system 130 to call location system 120*a* to retrieve HTML code and/or script. For example, the online game webpage provided by game system 120*b* may be implemented in an iframe with a "src" tag identifying the URL of location system 120*a*. When client system 130 consumes the HTML or other code of the page, client system 130 transmits a request to location system 120*a*. In one embodiment, the request includes a browser cookie or other state object appended there to that allows location system 120*a* to resolve the identity of User 101 (and possibly all or a subset of game state information associated with that user). If a script is used (e.g., JavaScript), the script when downloaded and executed might be operative to scan various attributes of webpages hosted by location system 120*a* to identify the one or more location attributes and transmit this location attribute data to game system 120*b*. For example, the webpage hosted by location system 120*a* may include semantic tags that identify elements of the page that correspond to the types and prices of items available for sale at location 115. Game system 120*b* may use this information to consider what type of incentive reward to offer User 101. As mentioned above, in response to the call from client system 130, game system 120*b* may access data stored in the cookie corresponding to the game system 120*b*, thereby allowing the game system to identify User 101. If game system 120*b* is able to successfully identify User 101 as a player in one or more online games hosted by game system 120*b*, it can then trigger the incentive offer search system and the action proposal search system.

In some embodiments, even if User 101 is not a user of game system 120*b*, the method may include offering an alternative type of incentive reward to User 101, such as an in-game benefit or asset that is not normally provided to new players. This might be done, for example, to encourage User 101 to establish a user account on game system 120*b*. For example, if User 101 is not a user of any game hosted by game system 120*b*, User 101 might be presented with an incentive reward offer of $100,000 in virtual poker chips if he performs a certain location-based action at location 115 and joins Zynga Poker, where a typical new poker player only receives $20,000 in virtual poker chips in that game.

The incentive offer search system and action proposal search system can determine an appropriate incentive reward and location-based action to present to User 101. An appropriate incentive reward and location-based action can be determined in a variety of ways. Once an appropriate incentive reward and location-based action have been determined, game system 120b can respond to the call from client system 130 with content that includes details of the incentive reward and the location-based action to be displayed on the browser client of client system 130. The incentive reward offer may be rendered, for example, in a discrete section of the online game interface viewed by User 101. The offer can include a variety of information about the incentive reward and location-based action, including a description of the in-game reward, an image, a description of the location and the action to be performed, and other details, as instructed by the script and other content transmitted in the response received from game system 120b. In one embodiment, game system 120b may generate a unique offer identifier that is associated with the offer transmitted to client system 130. The offer identifier can be included in the HTML code that becomes part of a Document Object Model (DOM) of the webpage as maintained by the browser client or other client application. If User 101 performed the location-based action, game system 120b and/or location system 120a may record the unique offer identifier in association with the offer. After User 101 performs the location-based action, location system 120a may transmit data to game system 120b indicating that the location-based action has been performed. This can be done in a variety of ways. Once game system 120b has confirmed that User 101 has completed the location-based action, game system 120b can then provide the incentive reward to User 101 or his player character. For example, game system 120b may update User 101's account to add the in-game reward to his in-game asset list, which will be presented or available to the user the next time he accesses the game. The entities associated with the game system 120b and location system 120a, to the extent they are separate, can contract to achieve a variety of revenue exchange or sharing paradigms that arise out of the incentive offers described herein. For example, the entity associated with game system 120b may receive a payment for each performed location-based action. In another embodiment, the entity associated with game system 120b may receive a payment when User 101 redeems the award.

Other methods are possible for determining and presenting an incentive reward offer and location-based action to a user. For example, a variety of method steps and data flows are possible. The methods and data flows described above, as well as alternatives, are described in more detail below.

Figure 2E:
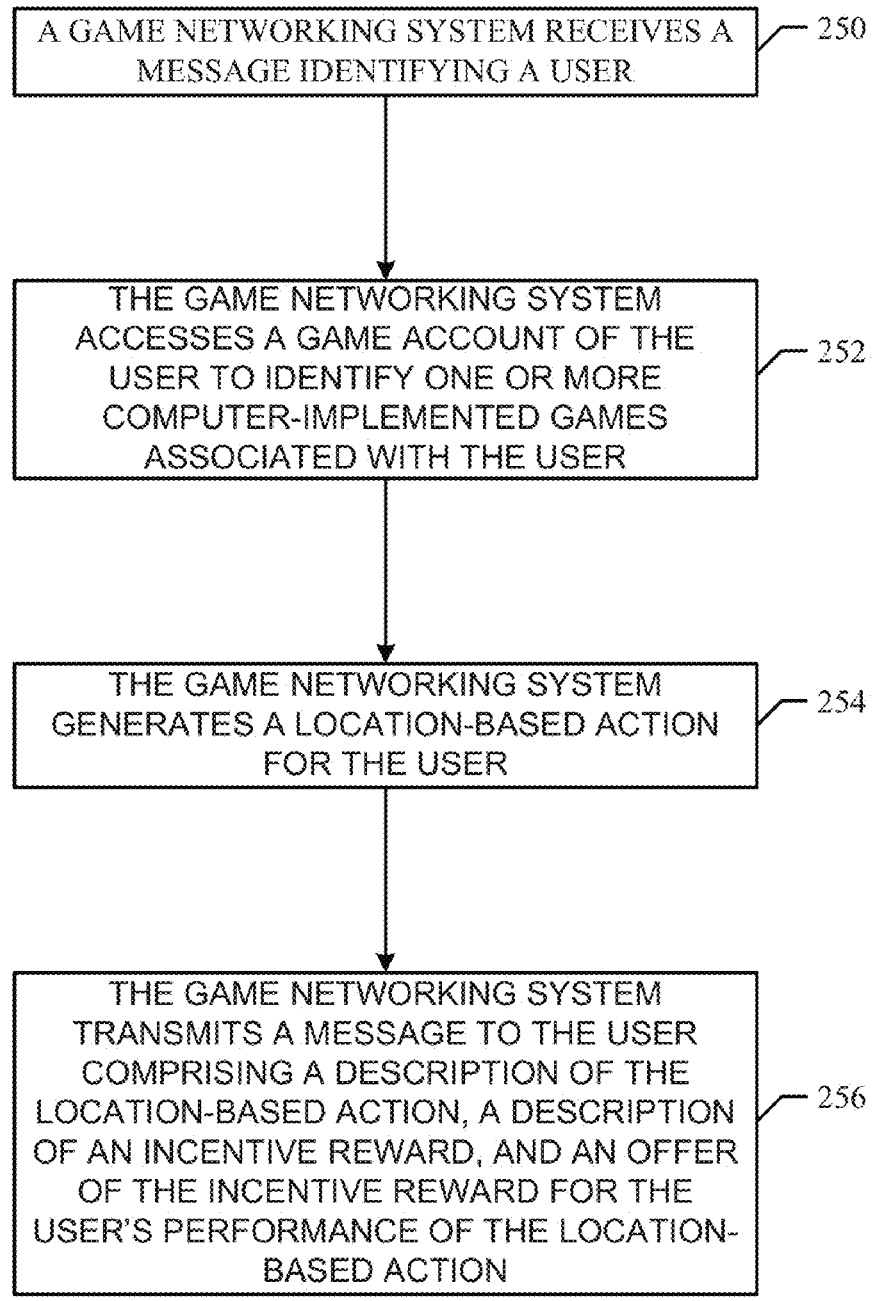
FIG. 2E shows a flowchart illustrating an example method for proposing a location-based action to a user.
Figure 2F:
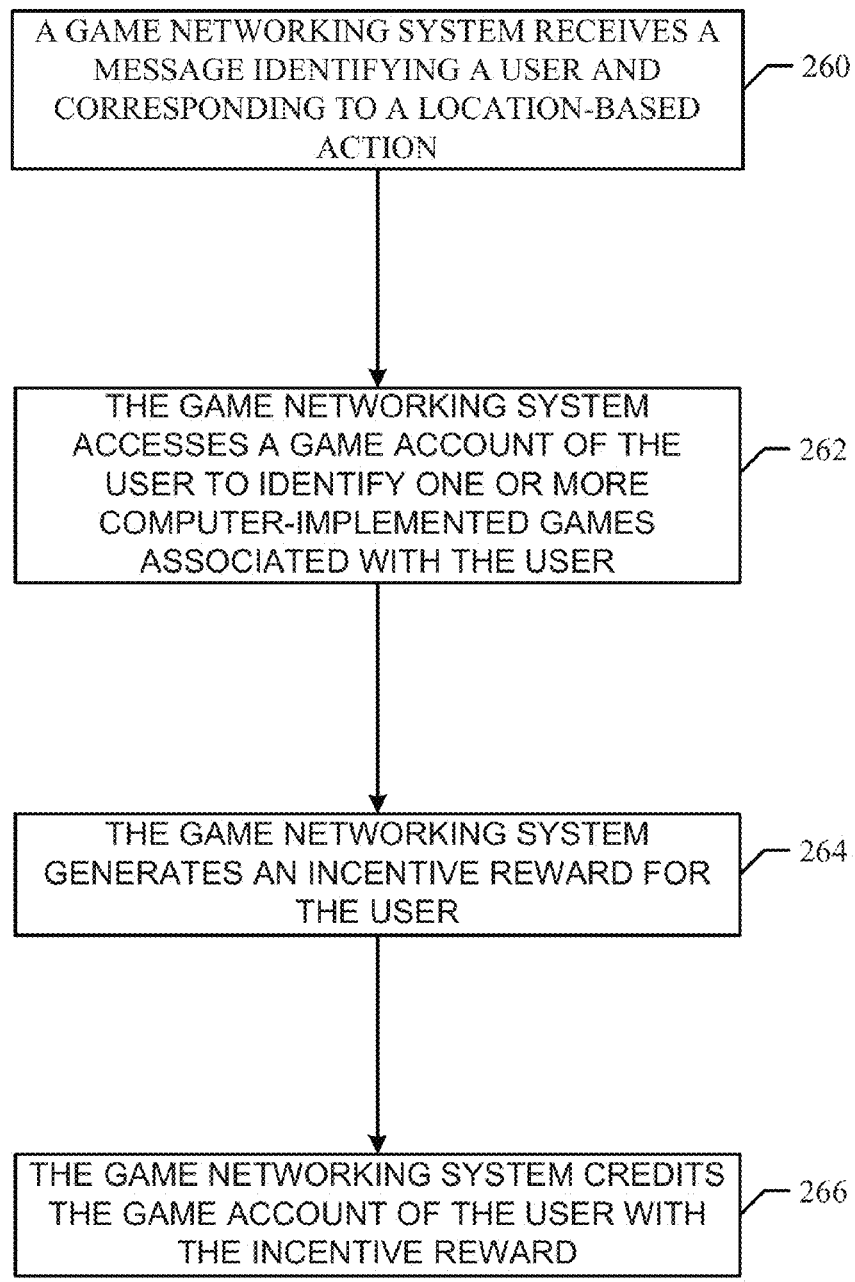
FIG. 2F shows a flowchart illustrating an example method for transferring an incentive reward to a user for performing a location-based action.

FIG. 2E shows a flowchart illustrating an example method for proposing a location-based action to a user. In various embodiments, game networking system 120b receives a message identifying a user at step 250. Game networking system 120b then accesses a game account of the user to identify one or more computer-implemented games associated with the user at step 252. Game networking system 120b then generates a location-based action for the user at step 254. Game networking system 120b then transmits a message to the user comprising a description of the location-based action, a description of an incentive reward, and an offer of the incentive reward for the user's performance of the location-based action at step 256. FIG. 2F shows a flowchart illustrating an example method for transferring an incentive reward to a user for performing a location-based action. In various embodiments, a game networking system 120b receives a message identifying a user and corresponding to a location-based action at step 260. The game networking system 120b then accesses a game account of the user to identify one or more computer-implemented games associated with the user at step 262. The game networking system 120b then generates an incentive reward for the user at step 264. The game networking system 120b then credits the game account of the user with the incentive reward at step 266. The example methods illustrated in FIGS. 2E and 2F and described above are provided for illustration purposes only and are not meant to be limiting. One of ordinary skill in the art would appreciate that the steps described above can be performed in any reasonable order, and that various steps can be reordered, added, and removed.

Verification of Location-Based Actions

In various embodiments, location 115 can have one or more verification systems 118 that can verify when a user has performed one or more location-based actions. Verification system 118 can verify performance of a location-based action using a variety of methods. Verification system 118 can generate, store, and transmit action verification data, which is data comprising information on one or more users and one or more location-based actions associated with the users. Action verification data can be transmitted to location system 120a, game system 120b, or client system 130, either directly or via network 160. In some embodiments, the action verification data can be generated by another system, such as client system 130, game system 120b, or location system 120a. This disclosure assumes that the action verification data is generated by verification system 118 and transmitted to location system 120a, however this is not intended to be limiting. Action verification data can include a variety of information regarding a location-based action, including information indicating: the user; the location-based action; if the action was performed by the user; when the location-based action was performed; where the location-based action was performed; how the location-based action was performed; and other information related to the location-based action. The methods described below are not intended to be limiting, and one of ordinary skill in the art would recognize that other methods can be used to verify performance of a location-based action.

In some embodiments, if the location-based action is purchasing an item at location 115, verification system 118 can verify the purchase using a variety of methods. When a user purchases an item at location 115, location system 120a may collect purchase information from the user, including the user's name, credit card number, billing address, shipping address, email address, etc. For example, if User 101 visits a store and purchases an item with a credit card, location system 120a could use the information contained on the credit card to identify the User 101.

In some embodiments, if the location-based action is verifying the presence of a user at location 115, verification system 118 can verify the user's presence at the location using a variety of methods. For example, verification system 118 can verify a user's location based on some form of identification presented at location 115; based on the user's proximity to location 115; when the user provides an indication of the user's presence at location 115; and by using other location verification methods.

Data Flow

Figure 3:
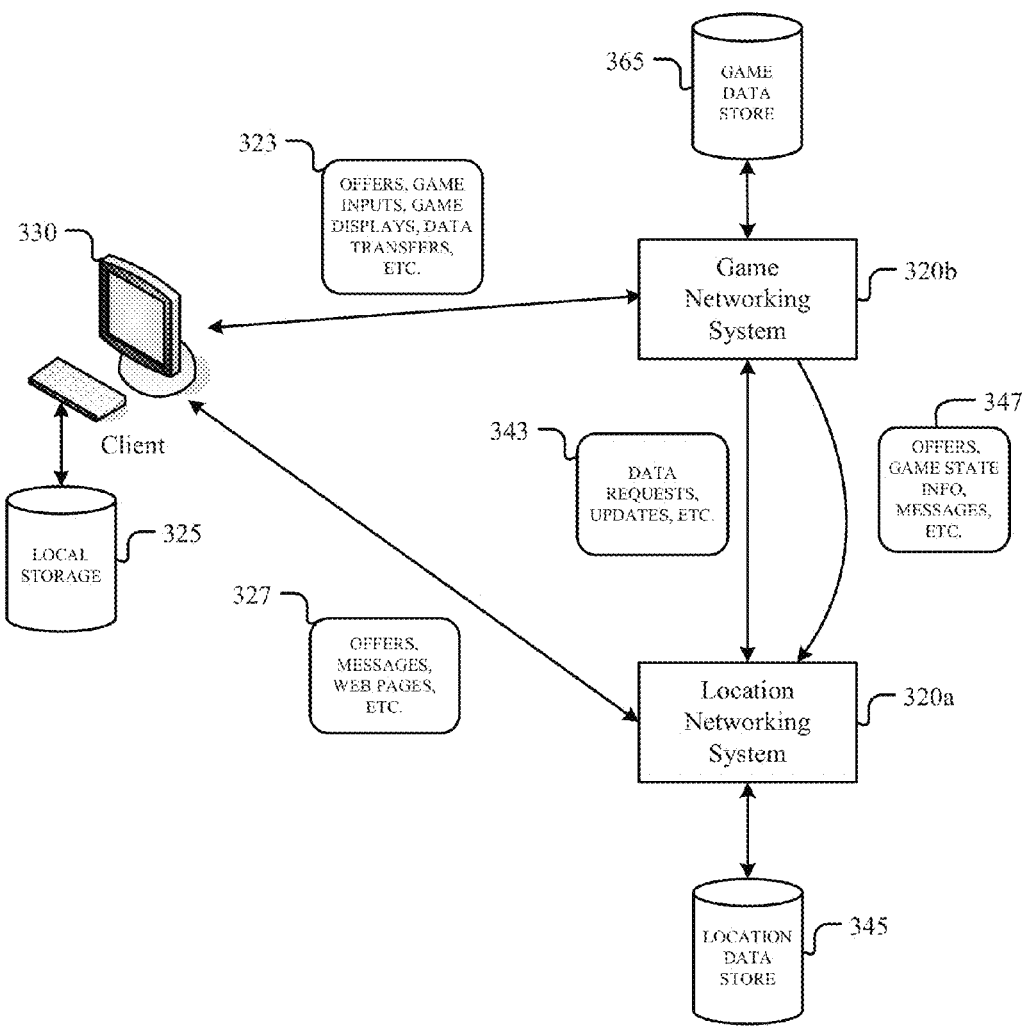
FIG. 3 illustrates a schematic of a system and data flow.

FIG. 3 depicts a schematic of system 300 and data flow between the components of system 300. System 300 can include client system 330, location networking system 320a, and game networking system 320b. Client system 330, location networking system 320a, and game networking system 320b can each have a corresponding data store such as local storage medium 325, location data storage medium 345, and game data storage medium 365, respectively. Client system 330 can communicate with location networking system 320a to receive messages, location information, etc. Additionally, client system 330 can transmit data to and receive data 323 (e.g., game inputs, incentive offer information, data transfers) from game networking system 320b. In a similar fashion, game networking system 320b and location networking system 320a can communicate HTTP packets 343 including data requests, transaction information, updates, etc. At some other time, or at the same time, game networking system 320b can communicate data 347 (e.g., game state information, game system account information, page info, messages) with location networking system 320a.

Communication between client system 330, location networking system 320a, and game networking system 320b can occur over any appropriate electronic communication medium or network using any suitable communications protocols. For example, client system 330, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher-layer communications protocols, including client-server (or request-response) protocols, such as the HyperText Transfer Protocol (HTTP) and other communications protocols, such as HTTP-S, FTP, SNMP, TELNET. In addition, a server in one interaction context may be a client in another interaction context. Still further, in particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In one embodiment, for example, a client request may cause a server to respond with a first data object, such as an HTML page, which itself refers to other data objects. A client application, such as a browser, will request these additional data objects as it parses or otherwise processes the first data object.

The example data flows in this section are presented with respect to data flow between location networking system 320a and game networking system 320b. One skilled in the art would appreciate that these are presented merely as an example of a data flow between two types of online systems. However, the present disclosure is intended to encompass data flows between a game networking system and a variety of other online systems, such as online merchant systems, online media systems, online reviewing systems, online search engines, and online advertising systems. The example data flows described herein function analogously with these online systems as with location networking systems.

In various embodiments, location system 320a, or game system 320b can receive messages identifying a user. For example, game system 320b can receive a digital message through a network, wherein the message contains information about the identity of the user. This message can be sent using any suitable communications protocol.

In one embodiment, messages with identifying information received by location system 320a or game system 320b will have been sent from the user. For example, the user could actively use a digital communication device (e.g., a computer or a smart phone) to send a message to game system 320b. In another example, the user could passively use a digital communication device (e.g., a computer or smart phone) to send a message to game system 320b by instructing the digital communication device to send a message to game system 320b if the device comes within a specified proximity of location 115. The user's proximity can be determined by a variety of methods (e.g., through the use of a Global Positioning System (GPS)).

In another embodiment, messages with identifying information received by game system 320b will have been sent from location 115 or location system 320a. For example, location 115 could use a computing system to send a message to game system 320b.

In various embodiments, a user can receive messages identifying both a location-based action and an offer for an incentive reward. For example, a user could receive from game system 320b a message describing a location-based action and an incentive reward through client system 330. In another example, a user could receive a similar message from location system 320a. In another example, a user could receive a message directly from location 115 (e.g., through the use of a physical receipt or through the use of a computer at the location).

In various embodiments, location system 320a or game system 320b can receive a message verifying that a user performed a proposed location-based action. For example, game system 320b can receive the message in a digital form transmitted over a network. In some embodiments, the message verifying that a user performed a location-based action could have been transmitted by location 115 or location system 320a to game system 320b through the use of verification system 118.

In various embodiments, location system 320a or game system 320b can verify the presence of a user relative to location 115. For example, the user could directly inform game system 320b that he is present at location 115 (e.g., by contacting the game networking system directly through the use of a digital communications device owned by the user). In another example, the user could indirectly inform game system 320b that he is present at location 115 (e.g., by permitting the game networking system to track his location through the use of Global Positioning Service (GPS) positioning based on a communications device owned by the user).

In one embodiment, game system 320b can verify the presence of a user at location 115 through the use of a Global Positioning Service (GPS) device. For example, the user could own a mobile client system 330 (e.g., a cell phone, pager, laptop, or tablet) that is in communication with a GPS system and game system 320b through a network. Game system 320b could then track the physical presence of the user relative to one or more locations. In another example, the mobile client system 330 could be in communication with a GPS system and location system 320a through a network. Location system 320a could then track the physical presence of the user relative to one or more locations. Location system 320a could then inform game system 320b of the physical presence of the user relative to the location.

In another embodiment, game system 320b can verify the presence of a user at location 115 through the use of a third party application, such as a social networking site (e.g., Facebook, Twitter), a location tracking site (e.g., Foursquare, Google Latitude), a location reservation site (e.g., OpenTable, Expedia), etc. For example, the application could notify game system 320*b* of the physical position of the user relative to a location based on data received from the site. In another example, the application could notify location system 320*a* of the physical position of the user relative to the location based on data received from the site. Location system 320*a* could inform game system 320*b* of the physical position of the user relative to the location.

In yet another embodiment, game system 320*b* can verify the presence of a user at location 115 through the use of codes (e.g., numerical codes, QR Codes, bar codes). For example, game system 320*b* could provide the user with a code that the user can take to location 115 that the user can input into a computing system (e.g., a cash register, computer), which can be transmitted to location system 320*a* and/or game system 320*b* to indicate the location of the user. In another example, the location operator can provide the user with a code that the user can input into his client system 330, which will transfer an indication of the user's location to location system 320*a* and/or game system 320*b*.

Systems and Methods

In various example embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 4:
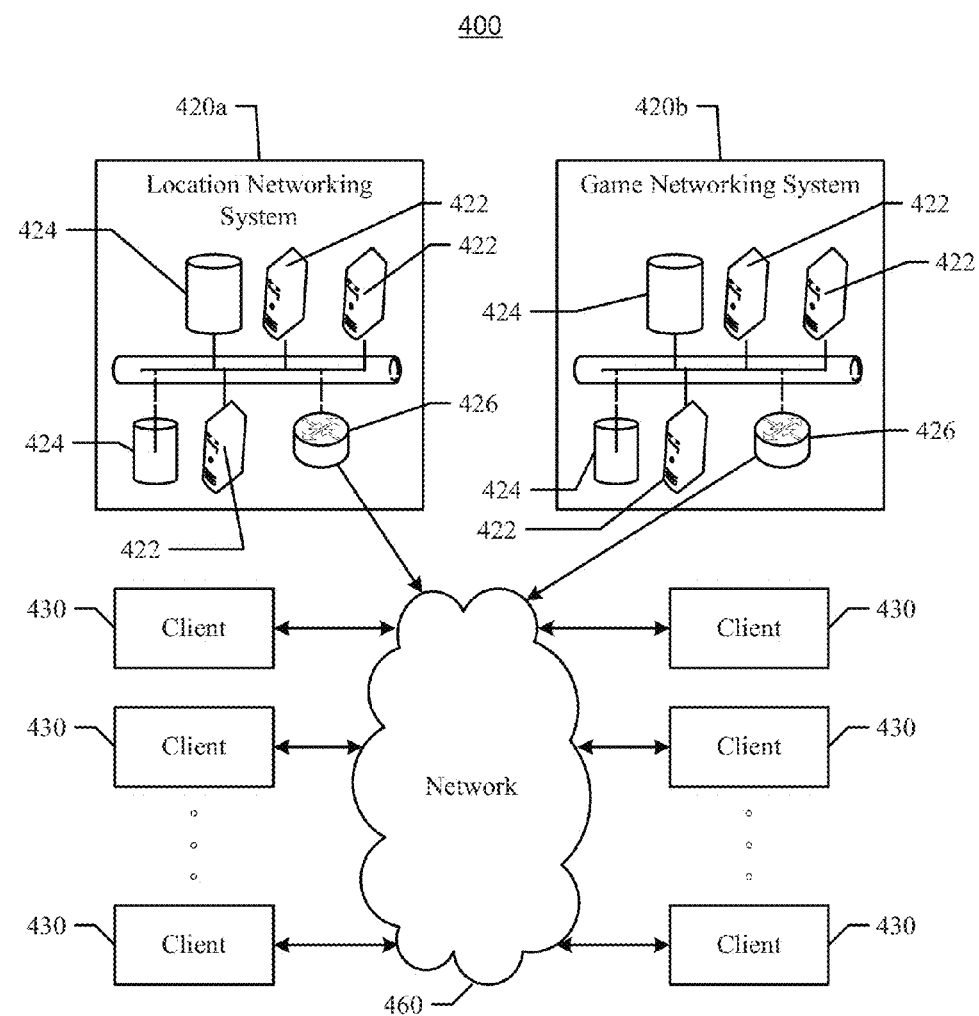
FIG. 4 illustrates an example network environment.

Particular embodiments may operate in a wide area network environment, such as the Internet, including multiple network addressable systems. FIG. 4 illustrates an example network environment, in which various example embodiments may operate. Network cloud 460 generally represents one or more interconnected networks, over which the systems and hosts described herein can communicate. Network cloud 460 may include packet-based wide area networks (such as the Internet), private networks, wireless networks, satellite networks, cellular networks, paging networks, and the like. As FIG. 4 illustrates, particular embodiments may operate in a network environment comprising one or more networking systems, such as location networking system 420*a* and game networking system 420*b*, and one or more client devices 430. The components of location networking system 420*a* and game networking system 420*b* operate analogously; as such, hereinafter they may be referred to simply at networking system 420. Client devices 430 are operably connected to the network environment via a network service provider, a wireless carrier, or any other suitable means.

Networking system 420 is a network addressable system that, in various example embodiments, comprises one or more physical servers 422 and data stores 424. The one or more physical servers 422 are operably connected to computer network 460 via, by way of example, a set of routers and/or networking switches 426. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 422 may host functionality directed to the operations of networking system 420. Hereinafter servers 422 may be referred to as server 422, although server 422 may include numerous servers hosting, for example, networking system 420, as well as other content distribution servers, data stores, and databases. Data store 424 may store content and data relating to, and enabling, operation of networking system 420 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 424 corresponds to one or more of a variety of separate and integrated databases, such as relational databases and object-oriented databases, that maintain information as an integrated collection of logically related records or files stored on one or more physical systems. Structurally, data store 424 may generally include one or more of a large class of data storage and management systems. In particular embodiments, data store 424 may be implemented by any suitable physical system(s) including components, such as one or more database servers, mass storage media, media library systems, storage area networks, data storage clouds, and the like. In one example embodiment, data store 424 includes one or more servers, databases (e.g., MySQL), and/or data warehouses. Data store 424 may include data associated with different networking system 420 users and/or client devices 430.

Client device 430 is generally a computer or computing device including functionality for communicating (e.g., remotely) over a computer network. Client device 430 may be a desktop computer, laptop computer, personal digital assistant (PDA), in- or out-of-car navigation system, smart phone or other cellular or mobile phone, or mobile gaming device, among other suitable computing devices. Client device 430 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client device 430 to enter addresses of specific network resources to be retrieved, such as resources hosted by networking system 420. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client device 430 desires to view a particular webpage (hereinafter also referred to as target structured document) hosted by networking system 420, the user's web browser, or other document rendering engine or suitable client application, formulates and transmits a request to networking system 420. The request generally includes a URL or other document identifier as well as metadata or other information. By way of example, the request may include information identifying the user, such as a user ID, as well as information identifying or characterizing the web browser or operating system running on the user's client computing device 430. The request may also include location information identifying a geographic location of the user's client device or a logical network location of the user's client device. The request may also include a timestamp identifying when the request was transmitted.

The example network environment described above and in FIG. 4 is presented with respect to location networking systems and game networking systems. One skilled in the art would appreciate that these are presented merely as an example of a network environment between two types of online systems. However, the present disclosure is intended to encompass network environments that include a game networking system and a variety of other online systems, such as online media systems, online reviewing systems, online search engines, and online advertising systems. The example network environment described above performs analogously with these other online systems as with location networking systems.

Figure 5:
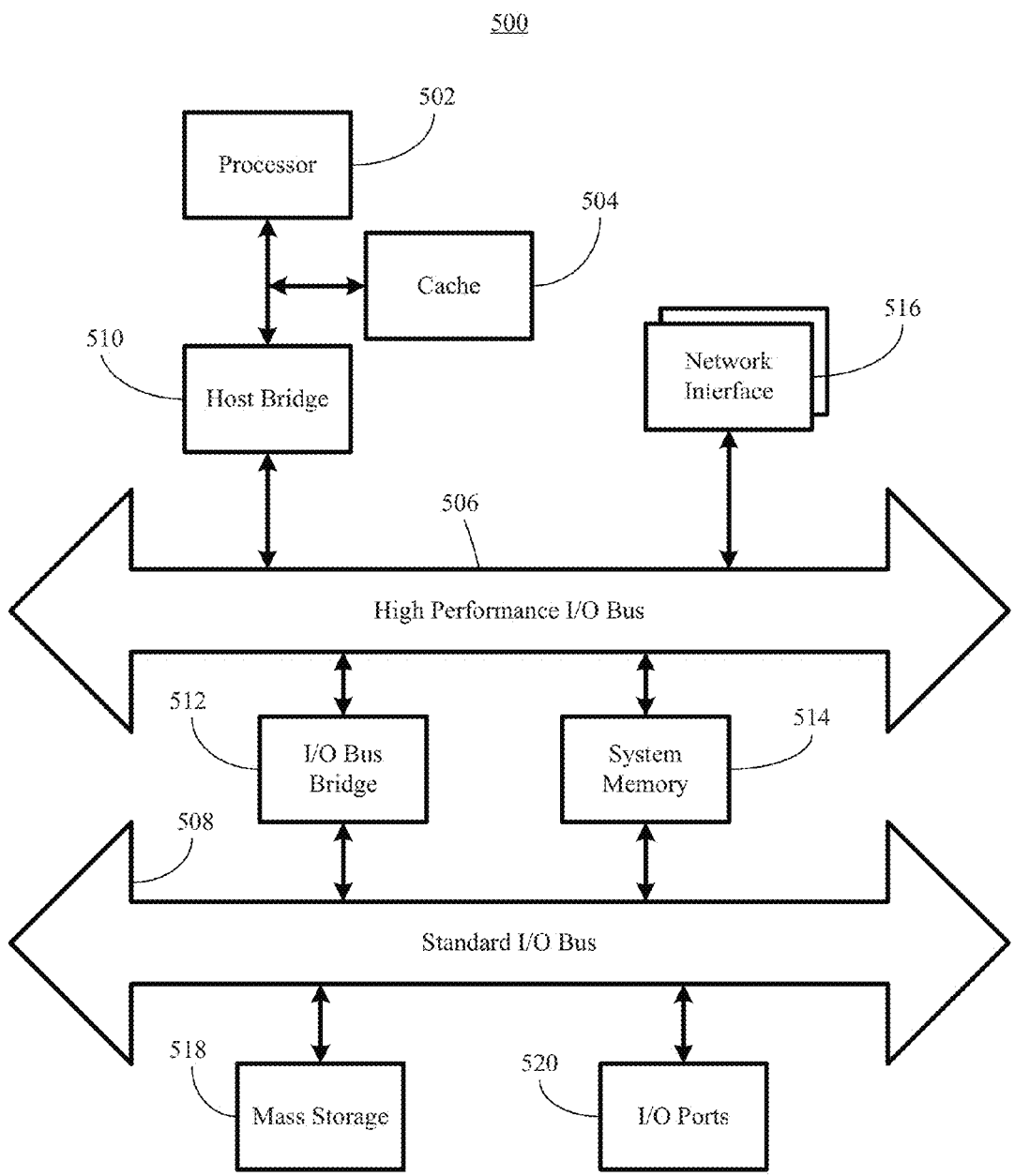
FIG. 5 illustrates an example computer system architecture.

FIG. 5 illustrates an example computing system architecture, which may be used to implement a server 422 or a client device 430. In one embodiment, hardware system 500 comprises a processor 502, a cache memory 504, and one or more executable modules and drivers, stored on a tangible computer readable medium, directed to the functions described herein. Additionally, hardware system 500 may include a high performance input/output (I/O) bus 506 and a standard I/O bus 508. A host bridge 510 may couple processor 502 to high performance I/O bus 506, whereas I/O bus bridge 512 couples the two buses 506 and 508 to each other. A system memory 514 and one or more network/communication interfaces 516 may couple to bus 506. Hardware system 500 may further include video memory (not shown) and a display device coupled to the video memory. Mass storage 518 and I/O ports 520 may couple to bus 508. Hardware system 500 may optionally include a keyboard, a pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in servers 422, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present disclosure may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital, assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
receiving verification data identifying a user of a computer-implemented game and indicating performance of a location-based action by the user at a physical location that is external to the computer-implemented game, the location-based action being determined based on retrieved game state data of the computer-implemented game;
accessing an account of the user;
identifying the computer-implemented game from the account; and
crediting, using a processor of a machine, the account with a reward based on the received verification data indicating the performance of the location-based action by the user at the physical location, the reward being usable within the computer-implemented game.

2. The method of claim 1, wherein the verification data further indicates when the location-based action was performed by the user.

3. The method of claim 1, wherein the verification data further indicates where the location-based action was performed by the user.

4. The method of claim 1, wherein the verification data further indicates how the location-based action was performed by the user.

5. The method of claim 1, wherein the location-based action is a purchase of an item at the physical location, the verification data including purchase information usable to identify the user.

6. The method of claim 1, wherein the location-based action is a presence of the user at the physical location.

7. The method of claim 6, wherein the verification data is based on a specified proximity of the user to the physical location.

8. The method of claim 7, wherein the proximity is determined using a selection from a group consisting of GPS, a social networking site, a location tracking site, and a location reservation site.

9. The method of claim 6, wherein the presence of the user is verified at the physical location based on a code located at the physical location that the user captures and transmits with their mobile device.

10. The method of claim 1, wherein the reward is a virtual item provided to a character controlled by the user in a virtual world of the computer-implemented game.

11. The method of claim 1, further comprising generating the reward to be provided to the user.

12. The method of claim 1, further comprising selecting the reward based on intellectual property information associated with the location.

13. The method of claim 1, wherein the reward is a mystery prize.

14. The method of claim 1, further comprising selecting the location-based action based on preferences of an operator of the physical location.

15. The method of claim 1, further comprising selecting the location-based action based on inventory of an operator of the physical location.

16. The method of claim 1, wherein the reward is determined based on a stored attribute of the physical location.

17. A non-transitory machine readable medium storing instructions that, when executed by at least one processor of a machine, causes the machine to perform operations comprising:
receiving verification data identifying a user of a computer-implemented game and indicating performance of a location-based action by the user at a physical location that is external to the computer-implemented game, the location-based action being determined based on retrieved game state data of the computer-implemented game;
accessing an account of the user;
identifying the computer-implemented game from the account; and
crediting the account with a reward based on the received verification data indicating the performance of the location-based action by the user at the physical location, the reward being usable within the computer-implemented game.

18. The non-transitory machine readable medium of claim 17, wherein the location-based action is a purchase of an item at the physical location, the verification data including purchase information usable to identify the user.

19. The non-transitory machine readable medium of claim 17, wherein the location-based action is a presence of the user at the physical location.

20. The non-transitory machine readable medium of claim 19, wherein the verification data is based on a proximity of the user to the physical location.

21. A system comprising:
at least one processor of a machine; and
a game networking system configured to:
receive verification data identifying a user of a computer-implemented game and indicating performance of a location-based action by the user at a physical location that is external to the computer-implemented game, the location-based action being determined based on retrieved game state data of the computer-implemented game,
access an account of the user,
identify the computer-implemented game from the account, and credit, using the at least one processor, the account with a reward based on the received verification data indicating the performance of the location-based action by the user at the physical location, the reward being usable within the computer-implemented game.

* * * * *